US012696906B2

(12) United States Patent
Soliman et al.

(10) Patent No.: US 12,696,906 B2
(45) Date of Patent: Aug. 4, 2026

(54) CONTROLLED-RELEASE DELIVERY COMPOSITIONS FOR EXTENDING THE LIFE OF PERISHABLE GOODS AND METHODS OF PRODUCTION AND USE THEREOF

(71) Applicant: Ryp Labs, Inc., Bothell, WA (US)

(72) Inventors: Ahmed Soliman, Kirkland, WA (US); Steven Hulteng, Mukilteo, WA (US); Ozgur Emek Yildirim, Bellevue, WA (US); Michelle Holtappels, Diest (BE); Benjamin Grady Jones, Issaquah, WA (US); Patrick Jozef Gerardus Van Dijck, Scherpenheuvel-Zichem (BE); Francesca Caruccio, Brussels (BE)

(73) Assignee: Ryp Labs, Inc., Bothell, WA (US)

( * ) Notice: Subject to any disclaimer, the term of this patent is extended or adjusted under 35 U.S.C. 154(b) by 206 days.

(21) Appl. No.: 18/551,336

(22) PCT Filed: Apr. 18, 2022

(86) PCT No.: PCT/US2022/025245
§ 371 (c)(1),
(2) Date: Sep. 19, 2023

(87) PCT Pub. No.: WO2022/221776
PCT Pub. Date: Oct. 20, 2022

(65) Prior Publication Data
US 2024/0156134 A1 May 16, 2024

Related U.S. Application Data

(60) Provisional application No. 63/176,030, filed on Apr. 16, 2021.

(51) Int. Cl.
*A23B 2/746* (2025.01)
*A23B 2/783* (2025.01)
(Continued)

(52) U.S. Cl.
CPC .............. *A23B 2/746* (2025.01); *A23B 2/783* (2025.01); *A23B 2/788* (2025.01); *A23B 7/155* (2013.01)

(58) Field of Classification Search
CPC ......... A23B 2/746; A23B 2/788; A23B 2/783; A23B 7/155
(Continued)

(56) References Cited

U.S. PATENT DOCUMENTS

| 2004/0234662 A1 | 11/2004 | Ben-Yehoshua | |
| 2009/0124504 A1* | 5/2009 | Sisler | C07C 211/48 |
| | | | 564/305 |

(Continued)

FOREIGN PATENT DOCUMENTS

| CN | 1592578 A | 3/2005 |
| CN | 107426993 A | 12/2017 |

(Continued)

OTHER PUBLICATIONS

International Preliminary Report on Patentability (IPRP) and Written Opinion mailed Mar. 26, 2024, issued in corresponding International PCT Application No. PCT/US2022/025245, filed Apr. 18, 2022, 8 pages.

(Continued)

*Primary Examiner* — Brent T O'Hern
(74) *Attorney, Agent, or Firm* — CHRISTENSEN O'CONNOR JOHNSON KINDNESS PLLC

(57) ABSTRACT

Controlled-release delivery compositions/systems are disclosed for use in the reduction in postharvest spoilage of fruits, vegetables, and plants by utilizing at least one matrix in which at least one volatile shelf-life extending agent is contained. Assemblies containing the controlled-release
(Continued)

delivery composition/system, as well as methods of producing and using the controlled-release delivery composition/system, are also disclosed.

21 Claims, 12 Drawing Sheets

(51) Int. Cl.
       *A23B 2/788*          (2025.01)
       *A23B 7/155*          (2006.01)
(58) Field of Classification Search
       USPC ......................................................... 426/321
       See application file for complete search history.

(56)                    References Cited

U.S. PATENT DOCUMENTS

| | | | | |
|---|---|---|---|---|
| 2012/0107459 | A1* | 5/2012 | Wood ..................... | A01N 25/22 |
| | | | | 426/106 |
| 2014/0154370 | A1 | 6/2014 | Wood et al. | |
| 2016/0198704 | A1* | 7/2016 | Wood ..................... | A01N 27/00 |
| | | | | 426/106 |
| 2019/0037839 | A1 | 2/2019 | Preslar et al. | |

FOREIGN PATENT DOCUMENTS

| | | |
|---|---|---|
| JP | 58063348 A | 4/1983 |
| JP | 2007-230023 A | 9/2007 |
| JP | 2010-057382 A | 3/2010 |
| JP | 2016-504296 A | 2/2016 |
| JP | 2019-507188 A | 3/2019 |
| WO | 2008149232 A2 | 12/2008 |
| WO | 2014/085518 A1 | 6/2014 |
| WO | 2015106342 A1 | 7/2015 |
| WO | 2017/143311 A1 | 8/2017 |
| WO | 2022221443 A1 | 10/2022 |

OTHER PUBLICATIONS

Office Action mailed Jul. 5, 2025, issued in corresponding Chinese Application No. 202280028812X, filed Apr. 18, 2022, 28 pages.

Supplementary Extended European Search Report mailed Feb. 4, 2025, issued in corresponding European Application No. 22789091. 0, filed Apr. 18, 2022, 12 pages.

Office Action, issued in corresponding Indonesian Application No. P00202312322, filed Apr. 18, 2022, 5 pages.

Office Action, issued in corresponding Chinese Application No. 202280028812X, filed Apr. 18, 2022, 24 pages.

Office Action received Apr. 21, 2026, issued in corresponding Japanese Application No. 2023-563042, filed Apr. 18, 2022, 19 pages.

Office Action received May 9, 2026, issued in corresponding Chinese Application No. 202280028812X, filed Apr. 18, 2022, 22 pages.

* cited by examiner

*MOL% C59 IN PARAFFIN OIL*

*MOL% C63 IN PARAFFIN OIL*

*MOL% C68 IN PARAFFIN OIL*

*MOL% C37 IN PARAFFIN OIL*

MOL% C59 IN PARAFFIN OIL

WT% C37 IN OLEOGEL

WT% C59 IN OLEOGEL

MOL% C37 IN AGAR

MOL% C59 IN AGAR

TIME (DAYS)

STRAWBERRIES INFECTED

TIME (DAYS)

PERCENT UNSALABLE GRAPES

BLUEBERRIES INFECTED

CONTROLLED-RELEASE DELIVERY COMPOSITIONS FOR EXTENDING THE LIFE OF PERISHABLE GOODS AND METHODS OF PRODUCTION AND USE THEREOF

CROSS REFERENCE TO RELATED APPLICATIONS/INCORPORATION BY REFERENCE STATEMENT

This application is a National Stage of International Application No. PCT/US2022/025245 filed Apr. 18, 2022, which claims benefit under 35 USC § 119 (e) of U.S. Provisional Application No. 63/176,030, filed Apr. 16, 2021. The entire contents of the above-referenced patent application(s) are hereby expressly incorporated herein by reference.

BACKGROUND

The spoilage of fruits, vegetables and plants is a cause of significant economic loss. Certain shelf-life extending agents, like essential oils, have an antimicrobial effect of extending the post-harvest life of at least one produce item when the active compounds are maintained at a required concentration level in the environment of the at least one produce item during the storage. In particular, various methods of encapsulating the active compounds in microscopic or macroscopic vesicles, micro-emulsions and nano emulsions, nanoparticles, or capsules with the shells acting as a diffusion barrier have been used to moderate the release rates of the shelf-life extending agents.

Historically, shelf-life extending agents have also been introduced into the environment via electromechanical-thermal-fluidic devices. The electromechanical-thermal-fluidic devices dispense the shelf-life extending compounds from a supply reservoir using a variety of delivery methods, which include injection, misting, atomization, nebulization or similar technologies.

Although these delivery mechanisms have assisted in the reduction of spoilage of at least one produce item, there remains a need for additional transmission systems that provide enhanced delivery of active compounds to further help reduce spoilage of fruits, vegetables, and plants.

DETAILED DESCRIPTION

Figure 1:
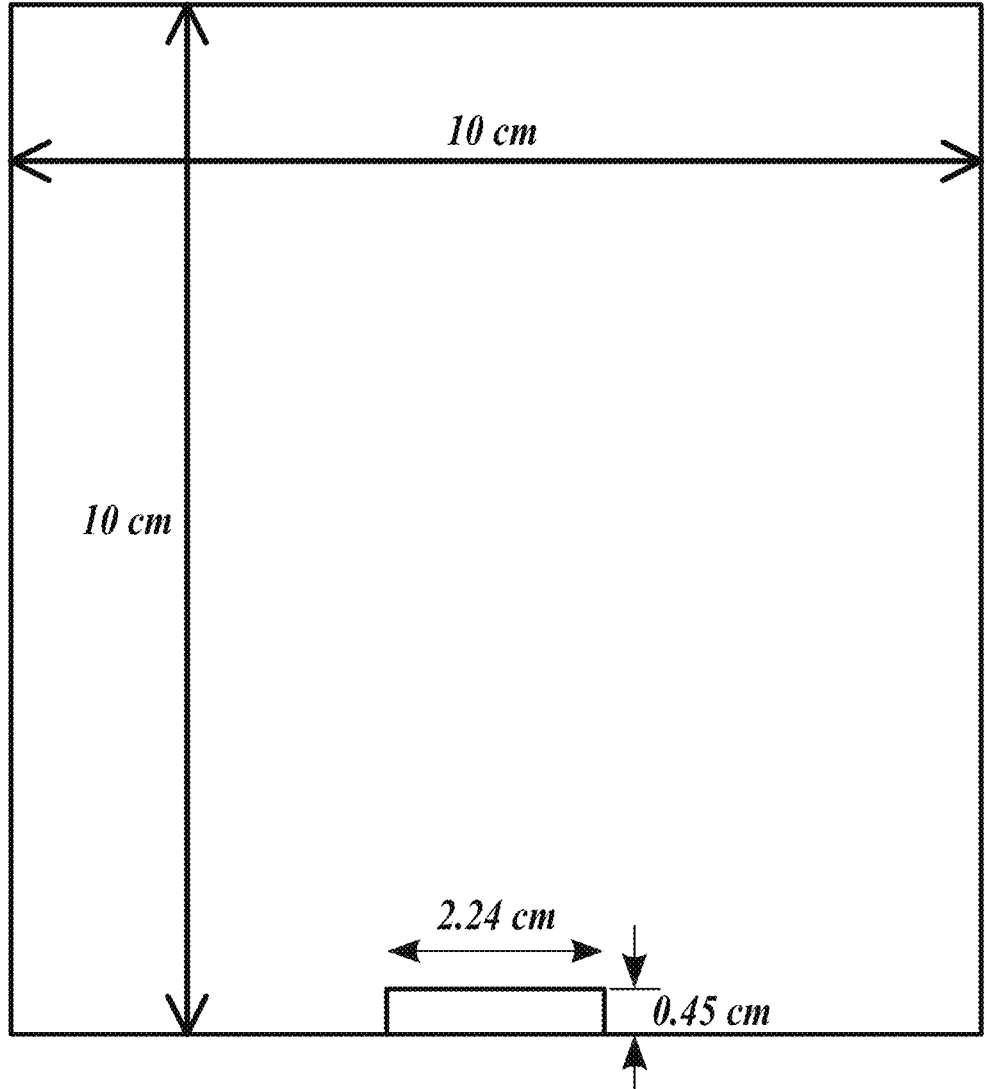
FIG. 1 depicts the positioning of a controlled-release delivery composition/system in an exemplary container, in accordance with one non-limiting embodiment of a method in accordance with the present disclosure.

Before explaining at least one embodiment of the presently disclosed and/or claimed inventive concept(s) in detail, it is to be understood that the presently disclosed and/or claimed inventive concept(s) is not limited in its application to the details of construction and the arrangement of the components or steps or methodologies set forth in the following description. The presently disclosed and/or claimed inventive concept(s) is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the presently disclosed and/or claimed inventive concept(s) shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the presently disclosed and/or claimed inventive concept(s) pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the presently disclosed and/or claimed inventive concept(s) have been described in terms of particular embodiments, it will be apparent to those skilled in the art that variations may be applied to the articles and/or methods and in the steps or in the sequence of steps of the method described herein without departing from the concept, spirit, and scope of the presently disclosed and/or claimed inventive concept(s).

As utilized in accordance with the present disclosure, the following terms, unless otherwise indicated, shall be understood to have the following meanings.

The use of the term "a" or "an" when used in conjunction with the term "comprising" in the claims and/or the specification may mean "one," but it is also consistent with the meaning of "one or more," "at least one," and "one or more than one." As such, the terms "a," "an," and "the" include plural referents unless the context clearly indicates otherwise. Thus, for example, reference to "a compound" may refer to one or more compounds, two or more compounds, three or more compounds, four or more compounds, or greater numbers of compounds. The term "plurality" refers to "two or more."

The use of the term "at least one" will be understood to include one as well as any quantity more than one, including but not limited to, 2, 3, 4, 5, 10, 15, 20, 30, 40, 50, 100, etc. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y, and Z" will be understood to include X alone, Y alone, and Z alone, as well as any combination of X, Y, and Z. The use of ordinal number terminology (i.e., "first," "second," "third," "fourth," etc.) is solely for the purpose of differentiating between two or more items and is not meant to imply any sequence or order or importance to one item over another or any order of addition, for example.

The use of the term "or" in the claims is used to mean an inclusive "and/or" unless explicitly indicated to refer to alternatives only or unless the alternatives are mutually exclusive. For example, a condition "A or B" is satisfied by any of the following: A is true (or present) and B is false (or not present), A is false (or not present) and B is true (or present), and both A and B are true (or present).

As used herein, any reference to "one embodiment," "an embodiment," "some embodiments," "one example," "for example," or "an example" means that a particular element, feature, structure, or characteristic described in connection with the embodiment is included in at least one embodiment. The appearance of the phrase "in some embodiments" or "one example" in various places in the specification is not necessarily all referring to the same embodiment, for example. Further, all references to one or more embodiments or examples are to be construed as non-limiting to the claims.

Throughout this application, the terms "about" and "approximately" are used to indicate that a value includes the inherent variation of error for a composition/apparatus/device, the method being employed to determine the value, or the variation that exists among the study subjects. That is, the terms "about" and "approximately" and variations thereof are intended to include not only the exact value qualified by the term, but to also include some slight deviations therefrom, such as deviations caused by measuring error, manufacturing tolerances, wear and tear on components or structures, settling or precipitation of cells or particles out of suspension or solution, chemical or biological degradation of solutions over time, stress exerted on structures, and combinations thereof, for example. In particular, for example, but not by way of limitation, when the term "about" is utilized, the designated value may vary by plus or minus twenty percent, or fifteen percent, or twelve percent, or eleven percent, or ten percent, or nine percent, or eight percent, or seven percent, or six percent, or five percent, or four percent, or three percent, or two percent, or one percent from the specified value, as such variations are appropriate to perform the disclosed methods and as understood by persons having ordinary skill in the art.

As used in this specification and claim(s), the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps. For example, a composition, a process, method, article, or apparatus that comprises a list of elements is not necessarily limited to only those elements but may include other elements not expressly listed or inherently present therein.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, when associated with a particular event or circumstance, the term "substantially" means that the subsequently described event or circumstance occurs at least 80% of the time, or at least 85% of the time, or at least 90% of the time, or at least 95% of the time. The term "substantially adjacent" may mean that two items are 100% adjacent to one another, or that the two items are within close proximity to one another but not 100% adjacent to one another, or that a portion of one of the two items is not 100% adjacent to the other item but is within close proximity to the other item.

As used herein, the phrases "attached to," associated with," and "coupled to" include both direct association/binding of two moieties to one another as well as indirect association/binding of two moieties to one another. Non-limiting examples of associations/couplings include covalent or non-covalent attachment/binding of one moiety to another moiety by a direct attachment/bond, non-covalent binding of one moiety to another moiety by means of a spacer group bound to both moieties, incorporation of one moiety into another moiety (such as by dissolving one moiety in another moiety or by synthesis, or applying/coating one moiety on another moiety), for example.

The presently disclosed and/or claimed inventive concept(s) relates generally controlled-release delivery compositions/systems for extending the life of produce and for the positioning of shelf-life extending agent(s) upon or in the atmosphere surrounding the produce to reduce the decomposition and degradation (i.e., spoilage) of the produce and thereby extend the life thereof. The controlled-release delivery composition/system extends the life of at least one produce item over a period of time by controlling the release of at least one shelf-life extending agent in a continuous and predictable manner so as to maintain a desired concentration of the at least one shelf-life extending agent in the environment of the at least one produce item (i.e., the atmosphere surrounding the at least one produce item).

In certain non-limiting embodiments, the controlled-release delivery composition/system for extending the life of at least one produce item comprises a matrix and at least one shelf-life extending agent disposed in the matrix. The controlled-release delivery composition/system may optionally include one or more of at least one solvent, at least one antioxidant, and/or at least one release-rate modifying agent. The release rate of the at least one shelf-life extending agent is the rate at which the shelf-life extending agent is released into the atmosphere/environment adjacent the at least one produce item.

The rate of release of the at least one shelf-life extending agent may be any rate desired, depending on the produce to be protected. For example, but not by way of limitation, the rate of release may be approximately instantaneous, about one day, about two days, about three days, about four days, about five days, about six days, about seven days, about one week, about eight days, about nine days, about 10 days, about 11 days, about 12 days, about 13 days, about 14 days, about two weeks, about 15 days, about 16 days, about 17 days, about 18 days, about 19 days, about 20 days, about 21 days, about three weeks, about 22 days, about 23 days, about 24 days, about 25 days, about 26 days, about 27 days, about 28 days, about four weeks, about 29 days, about 30 days, about one month, about 31 days, about 32 days, about 33 days, about 34 days, about 35 days, about five weeks, about 36 days, about 37 days, about 38 days, about 39 days, about 40 days, about 41 days, about 42 days, about six weeks, about 43 days, about 44 days, about 45 days, about 46 days, about 47 days, about 48 days, about 49 days, about seven weeks, about 50 days, about eight weeks, about two months, about nine weeks, about 10 weeks, about 11 weeks, about 12 weeks, about three months, about 13 weeks, about 14 weeks, about 15 weeks, about 16 weeks, about four months, and longer, as well as a range that contains any of the above values (i.e., a range of from about instantaneous to about four months, a range of from about instantaneous to about one month, a range of from about one day to about one month, etc.). In addition, the release may be continuous and/or intermittent over the period of release.

The release rate of the controlled-release delivery composition/system into the atmosphere/environment adjacent the one or more produce item is dependent on a variety of factors. Certain factors which affect the release rate of the at least one shelf-life extending agent may be intrinsic and extrinsic. The intrinsic factors that affect the release rate of the at least one shelf-life extending agent include (for example, but not by way of limitation) the structure and composition of the matrix, equilibrium vapor pressure, molecular diffusivity of the at least one shelf-life extending agent through the matrix, the concentration of the at least one shelf-life extending agent in the controlled-release delivery composition/system, and the like.

The equilibrium vapor pressure of at least one shelf-life extending agent in the controlled-release delivery composition/system may be dependent upon the chemical affinity the at least one shelf-life extending agent has for the matrix and the concentration of the at least one shelf-life extending agent positioned within the matrix. A higher chemical affinity the at least-one shelf-life extending compound has with the matrix may decrease equilibrium vapor pressure of the at least one shelf-life extending agent, whereas a lower chemical affinity of the at least one shelf-life extending agent may increase the equilibrium vapor pressure of the shelf-life extending agent. In one non-limiting embodiment, the equilibrium vapor pressure may be modified by the controlled-release delivery composition/system also comprising a release-rate modifying agent.

The concentration, or the relative fraction, of the at least one shelf-life extending agent in the composite may also modify the vapor pressure. In general, the equilibrium vapor pressure of the controlled-release delivery composition/system may increase with an increasing concentration of the at least one shelf-life extending agent in the controlled-release delivery composition. As such, the effects of concentration of the at least one shelf-life extending agent and the chemical affinity of the shelf-life extending agent for the matrix of the controlled-release delivery composition/system may result in an equilibrium vapor pressure that is non-linear. As such, modifying the matrix of the controlled-release delivery composition/system and/or having the controlled-release delivery composition/system further comprising a release-rate modifying agent may affect the release rate of the at least one shelf-life extending agent of the controlled-release delivery composition/system.

Further, the molecular diffusivity of the at least one shelf-life extending agent of the controlled-release delivery composition/system through the additional barriers surrounding the environment adjacent the at least one produce item may affect the release rate of the at least one shelf-life extending agent of the controlled-release delivery composition/system. The additional barriers may be a container comprising plastic, cardboard, xxx, or combinations thereof. Further, the physical embodiment of the controlled-release delivery composition/system may affect the molecular diffusivity of the at least one shelf-life extending agent. In other non-limiting embodiments, the chemical compounds of the controlled-release delivery composition/system, as well as the microstructure of the controlled-release delivery composition/system may affect the molecular diffusivity of the controlled-release delivery composition/system. By way of example, but in no way limiting, the matrix having a cross-linked polymer matrix may slow the diffusion of the at least one-shelf life extending agent versus the same polymer having less cross-linking. In another example, but in no way limiting, when the controlled-release delivery composition/system has a microporous structure, the at least one shelf-life extending agent may have different tortuosity values. In this case, the shelf-life extending agent of the controlled-release delivery composition/system having a microporous structure having a high tortuosity will have a higher diffusion retardation effect than the controlled-release delivery composition/system having a microporous structure having a lower tortuosity.

Further, in a similar fashion to how chemical affinity between shelf-life extending agent(s) and matrix components can significantly affect vapor pressure, chemical affinity may affect diffusion rate and release rate. Stronger chemical affinities tend to slow down diffusion, decreasing the release rate of shelf-life extending agent(s). In some non-limiting embodiments, a release-rate modifying agents may change the release rate of shelf-life extending agent(s) by modifying either the overall matrix chemical affinity or the overall diffusivity, or a combination thereof. Release-rate modifying agents may alter the at least one shelf-life extending agent chemical affinity for the matrix, including but not limited to, affecting the hydrogen-bonding network, affecting the overall charge density between the at least one shelf-life extending agent and the matrix, changing the relative hydrophobicity between the at least one shelf-life extending agent and the matrix, etc. Release-rate modifying agents may be used to increase or decrease the equilibrium vapor pressure and/or the release-rate of the at least one shelf-life extending agent. By way of example, but in no way limiting, the release-rate modifying agent may increase the release rate of an alcohol shelf-life extending agent while decreasing the release rate of a hydrocarbon shelf-life extending agent. Release-rate modifying agents may also adjust the molecular diffusivity of the at least one shelf-life extending agent by altering the chemical affinity of the matrix or by altering the microstructure of the controlled-release delivery composition/system. By way of example, but in no way limiting, a release-rate modifying agent may modify the crystallinity of the controlled-release delivery composition/system, the microemulsion microstructure of the controlled-release delivery composition/system, or the cross-linking density of the controlled-release delivery composition/system.

Further, the concentration of the shelf-life extension agent in the controlled-release delivery composition/system. The high concentration of the at least one shelf-life extending agent may be limited by the carrying capacity of the matrix of the controlled-release delivery composition/system. For example, but in no way limiting, a controlled-release delivery composition/system having a matrix and a microporous structure, wherein the microporous structure has a higher porosity, will have a larger carrying capacity for the at least one shelf-life extending agent than a controlled-release delivery composition/system having a matrix and a microporous structure, wherein the microporous structure having a lower porosity. In some non-limiting embodiments, the at least one shelf-life extending agent may self-segregate into internal surface areas of the microstructure thereby affecting the carrying capacity of the controlled-release delivery composition/system.

The release rate of the at least one shelf-life extending agent may be affected by the structure and/or composition of the controlled-release delivery composition and/or by extrinsic factors. Extrinsic factors that may affect the release rate of the at least one shelf-life extending agent may include environmental factors such as (but not limited to) temperature, humidity, light, and chemical composition of the environment adjacent to the controlled-release delivery composition/system. Further, in other non-limiting embodiments, additional concentrations of the at least one shelf-life extending agent present in the environment adjacent the at least one produce item may affect the release-rate of the at least one shelf-life extending agent of the controlled-release delivery composition as the additional shelf-life extending agent may be in a thermodynamic equilibrium with the at least one shelf-life extending agent of the controlled-release delivery composition/system. The release rate of the at least one shelf-life extending agent may be in a range from about 0.001 to about 10,000 ppm/minute/gram of the controlled-release delivery composition. In other non-limiting embodiments, other extrinsic factors may also be mechanical vibrations or motions present in the environment that exert forces on the controlled-release delivery composition.

The shelf-life extending agent may be selected from the group consisting of an antimicrobial compound, an immunostimulatory compound, an ethylene inhibitor, and combinations thereof. The matrix may be chosen from a group consisting of an emulsifier, a wax, polymer, ceramic, and combinations thereof. The controlled-release delivery may further include at least one solvent or thinning agent. In certain non-limiting embodiments, the solvent or thinning agent may be chosen form the group consisting of polar solvents (such as but not limited to, alcohol), oil, water, and combinations thereof.

The at least one produce item may include, but is not limited to fruit, vegetable, legume, tuber, plants, or the like. In one non-limiting embodiment the controlled-release delivery composition/system may be positioned adjacent to the least one produce item pre-harvest or post-harvest. In another non-limiting embodiment, the controlled-release delivery composition/system positioned on at least one surface of the at least one produce item The shelf-life extending agent may be selected from the group consisting of at least one antimicrobial compound, at least one immunostimulatory compound, at least one ethylene inhibitor, and combinations thereof.

In some non-limiting embodiments, the shelf-life extending agent may be an antimicrobial compound (such as, but not limited to, an antifungal compound) that comprises at least one essential oil. The antimicrobial compound may have a high level of volatility, a moderate level of volatility, and a low level of volatility. The high level of volatility of the antimicrobial compound has an equilibrium vapor pressure approximately greater than 400 ppm at room temperature. The antimicrobial compound having a moderate level of volatility an equilibrium vapor pressure approximately between 400 ppm and 100 ppm at room temperature. The antimicrobial compound having a low level of volatility has an equilibrium vapor pressure greater than 100 ppm at room temperature. Room temperature is between approximately 20° C. and 25° C.

In one non-limiting embodiment, the essential oil may be a complex mixture of different organic molecules, also known as essential oil components (EOCs); non-limiting examples thereof include monoterpenes, diterpenes, sesquiterpenes, or their oxygenated forms, terpenoids, alcohols, esters, aldehydes, ketones, phenols, thiols, alkaloids, and combinations thereof. In one non-limiting embodiment, the essential oil compound may be distilled or extracted from at least one plant. For example, but in no way limiting, the essential oil compound distilled or extracted from at least one plant may be thyme oil, tea tree oil, citrus oil, combinations thereof, and the like. The chemical composition of the essential oil may vary depending on time of day, the month, or season the essential oil is harvested. The at least one antimicrobial compound having a high level of volatility may be selected from the group consisting of hexanal, hexenal, limonene, pinene, myrcene, ocimene, terpinene, cymene, menthane, phellandrene, fenchene, bornylene, camphene, camphor, fenchone, octanal, octenal, nonanal, nonenal, nonadienol, hexanol, hexenol, carvone, o-anisal, p-anisal, and combinations thereof.

The at least one antimicrobial compound having a moderate level of volatility may be selected from the group consisting of citronellal, citral, nonadienal, geranial, nerol, neral, octanol, octenol, decanal, decenal, decadienal, menthone, and combinations thereof.

The at least one antimicrobial compound having a low level of volatility may be selected from the group consisting of cuminal, perillal, carvacrol, thymol, nerolidol, rhodinol, cuminol, menthol, cinnamal, terpinene-4-ol, terpineol, borneol, myrtenal, myrtenol, fenchol, piperonol, piperonal, pulegol, carveol, perillol, phellandral, piperitone, citronellol, decanol, decenol, geraniol, nonanol, nonenol, farnesol, decadienol, dodecanal, dodecanal, dodecadienal, pulegone, eugenol, linalool, anethole, raspberry ketone, ionone, damescenone, lilac aldehyde, furanones, verbenol, myrcenol, thujanol, caryophyllene, and combinations thereof.

In some non-limiting embodiments, the antimicrobial compound may be a synthetic oil. A non-limiting example of the synthetic oil may be chosen from a group consisting of menthol, eucalyptol, and combinations thereof. Synthetic oils may have at least one of EOC of a particular essential oil. Further, the chemical composition of the synthetic oils may vary from batch to batch. The antimicrobial compound may suppress the growth, spread, and/or proliferation of at least one microorganism that may cause spoilage of the at least one produce item. The at least one microorganism may be a fungus, bacteria, mold, yeast, or the like.

In one non-limiting embodiment, the controlled-release delivery composition/system may include at least a first antimicrobial compound and a second antimicrobial compound. The two or more antimicrobial compounds may create a synergistic effect of an extended life of the at least one produce item as compared to controlled-release delivery composition/system comprising one antimicrobial compound. The two or more antimicrobial compounds of the controlled-release delivery composition/system may act in concert or may act independently of one another.

In one non-limiting embodiment, the presently disclosed and/or claimed inventive concept(s) may be the controlled-release delivery composition/system having a matrix and an antimicrobial compound to achieve a desired biological outcome. The controlled-release delivery composition/system comprising the matrix and the antimicrobial compound may create a synergistic effect of an increased extension of life of the at least one produce item loss.

In other non-limiting embodiments, the shelf-life extending agent may be at least one immunostimulatory compound. The immunostimulatory compound may be chosen from a group consisting of methyl jasmonate, methyl salicylate, methyl cinnamate, pinene, and combinations thereof. The immunostimulatory compound refers to a compound that does not directly affect a diseased organism, nor alter the DNA of at least one produce item. The immunostimulatory compound, activates a natural defense mechanism in the at least one produce item. It is understood to those of ordinary skill in the art that the term immunostimulatory stimulatory compound may also be known as a "plant activator." The concentration of the immunostimulatory compound in the controlled-release delivery composition/system may be in a range of about .1% to about 20% by weight.

In one non-limiting embodiment, the presently disclosed and/or claimed inventive concept(s) may be the controlled-release delivery composition/system comprising the matrix, at least one antimicrobial compound, and at least one immunostimulatory compound. For example, the controlled-release delivery composition/system comprising at least one antimicrobial compound may suppress the growth and spread of a first fungus on at least one produce item, and the immunostimulatory compound may activate the natural defense of the at least one produce item against the first fungus, thereby achieving a desired biological outcome of reducing loss of the at least one produce item due to the first fungus. In one non-limiting embodiment, the controlled-release delivery composition/system comprising the matrix, at least one antimicrobial compound, and at least one immunostimulatory compound may create a synergistic effect of an increased reduction in loss of the at least one produce item compared to the loss of the at least one produce item upon which the matrix, at least one antimicrobial compound, and at least one immunostimulatory compound are applied individually to the at least one produce item. In another embodiment, the controlled-release delivery composition/system having a lower concentration of the antimicrobial compound and a lower concentration of the immunostimulatory compound may achieve the same desired biological result once applied to the at least one produce item as an controlled-release delivery composition/system having a higher concentration of the antimicrobial compound and an controlled-release delivery composition/system having a higher concentration of an immunostimulatory compound individually applied to the at least one produce item.

In other non-limiting embodiments, the shelf-life extending agent may be an ethylene inhibitor selected from the group consisting 1-alkene, 1-butene, 1-pentene, 1-hexene, 1-heptene, 1-octene, 1-nonene, 1-decene, 1-dodecene, 1-tetradecene, eugenol, limonene, 1-methylcyclopropene, linalool, myrcene, ocimene, pinene, camphene, linalyl acetate, dihydrotagetone, estragole, nerolidol, chavicol, 4-allylanisole, and combinations thereof.

The ethylene inhibitor refers to a compound that inhibits the signaling of an ethylene related pathway and/or production of ethylene in the at least one produce item by blocking an ethylene signal receptor in the at least one produce item or inhibiting the biosynthesis of ethylene by the at least one produce item. Ethylene is known as "the ripening hormone" and is a gaseous compound released by some produce items, which may cause the produce item to ripen. The concentration of the ethylene inhibitor in the edible spray or coating composition may be in a range of about 0.1% to about 20% by weight.

In one non-limiting embodiment, the controlled-release delivery composition/system may comprise the antimicrobial compound, which may suppress the growth and spread of a first fungus on a produce item and the ethylene inhibitor compound, which may absorb the block the signaling of an ethylene related pathway and/or inhibit the production and release of ethylene by the produced item. The controlled-release delivery composition/system may be positioned in the environment adjacent at least one produce item or positioned on at least one surface of the at least one produce item to achieve the desired biological outcome of reducing the degradation of the at least one produce item due to the first fungus and ethylene. The controlled-release delivery composition/system having the antimicrobial compound and the ethylene inhibitor may create a synergistic effect of an increased extension of life of the at least one produce item compared to the extension of life of the at least one produce item when the antimicrobial compound and the ethylene inhibitor are applied to the surface of the at least one produce item individually.

In other non-limiting embodiments, the controlled-release delivery composition may further include at least one antioxidant. In certain non-limiting embodiments, the antioxidant functions to preserve the active ingredients (i.e., shelf-life extending agents) of the composition. Any antioxidant known in the art or otherwise contemplated herein that is capable of functioning to preserve the active ingredients of the composition may be utilized in accordance with the present disclosure. Non-limiting examples of antioxidants that may be utilized include vitamin A, vitamin C, vitamin E, thiols, tocopherol, catechins, anthocyanins, polyphenols, resveratrol, butylated hydroxytoluene (BHT), butylated hydroxyanisole (BHA), and combinations thereof. The concentration of the antioxidant in the controlled-release delivery composition may be in a range of from about 0.1% to about 20% by weight.

In certain particular (but non-limiting) embodiments, the controlled-release delivery composition contains two or more volatile shelf-life extending agents, such as (but not limited to), three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, 20 or more, 21 or more, 22 or more, 23 or more 24 or more, 25 or more, 26 or more, 27 or more, 28 or more, 29 or more, 30 or more, 35 or more, 40 or more, 45 or more, or 50 or more shelf-life extending agents. When two or more shelf-life extending agents are present, the agents may be from the same class of compounds (i.e., antimicrobial compound, immunostimulatory compound, ethylene inhibitor, etc.) or from a combination of classes of compounds.

The shelf-life extending agent(s) may be present in the controlled-release delivery composition/system at any percentage of concentration that allows the composition to function as described or as otherwise contemplated herein. For example (but not by way of limitation), each shelf-life extending agent may be present in the composition at a percent concentration of about 0.001%, about 0.005%, about 0.01%, about 0.05%, about 0.1%, about 0.5%, about 1%, about 2%, about 3%, about 4%, about 5%, about 6%, about 7%, about 8%, about 9%, about 10%, about 15%, about 20%, about 25%, about 30%, or higher. In addition, the scope of the presently disclosure also includes the presence of each shelf-life extending agent in the composition at any percent concentration that falls within any range formed from the combination of two values listed above (for example, a range of from about 0.01% to about 30%, a range of from about 0.05% to about 25%, a range of from about 0.1% to about 20%, etc.).

The matrix of the controlled-release delivery composition/system for extending the life of at least one produce item in the presently disclosed and/or claimed inventive concept may be chosen from a group consisting of an emulsifier, a wax, a ceramic, a polymer, and combinations thereof. The matrix may be in a rigid solid physical state such as (but not limited to) a piece of wax or soap, or a semi-solid or soft solid physical state such as (but not limited to) a gel or a paste. The matrix may prevent the spoilage of the at least one produce item via the placement of the controlled-release delivery composition/system on at least one surface of the produce item and the like. In other non-limiting embodiments, the matrix may prevent the spoilage of the at least one produce item via the placement of the controlled-release delivery composition/system adjacent the at least one produce item. The controlled-release delivery composition/system may be positioned within a carrier. In other non-limiting embodiments, the controlled-release delivery composition/system may be positioned on at least one surface of a container in which the at least one produce item is positioned.

In some non-limiting embodiments, the matrix may be an emulsifier. The emulsifier may be chosen from a group consisting of monoglycerides, diglycerides, fatty acids, fatty acid salts, fatty alcohols, lecithin, glycerol, sterols, and combinations thereof. The concentration of the emulsifier in the controlled-release delivery composition may be in a range of about 1% to about 99% by weight. U.S. Patent Publication No. 20200383343 is herein incorporated by reference. In other non-limiting embodiments, the matrix may be a wax. The wax may be chosen from a group consisting of beeswax, lanolin, Carnauba wax, Candelilla wax, Bayberry wax, soy wax, paraffin wax, candle wax, and combinations thereof. The concentration of the wax in the matrix of the controlled-release delivery composition/system at the time of application to the at least one produce item may be in a range of about 1% to about 99% by weight. In other non-limiting embodiments, the matrix may be a ceramic. The ceramic may be chosen from a group consisting of zeolite, activated carbon, silica, alumina, and combinations thereof.

In some embodiment, the matrix may be a polymer, wherein a polymer may be chosen from a group consisting of protein, polysaccharide, gum, a synthetic polymer, and combinations thereof. The protein may be selected from the group consisting of collagen, gelatin, silk, gluten, zein, caseins, keratin, soy protein, pea protein, sunflower protein, and combinations thereof. The concentration of the protein in the matrix of the controlled-release delivery composition/system may be in a range of about 1% to about 99.9% by weight. U.S. Patent Publication No. 20200178576 is herein incorporated by reference.

In other non-limiting embodiments, the matrix may be a polysaccharide. The polysaccharide may be chosen from a group consisting of cellulose, pectin, chitosan, chitin, alginate, starch, carrageenan agar, shellac, hyaluronic acid, inulin, lingin, and combinations thereof. The concentration of the polysaccharide in the matrix of the controlled-release delivery composition/system may be in a range of about 1% to about 90%. In other non-limiting embodiments, the matrix material may be a gum. The gum may be selected from the group consisting of xanthan gum, gum Arabic, Guar gum, locust bean bum, mastic, gellan gum, spruce gum, and combinations thereof. The concentration of the gum in the matrix of the controlled-release delivery composition/system may be in a range of about 1% to about 90%. In other non-limiting embodiments, the matrix may be a synthetic polymer. The synthetic polymer may be chosen from a group consisting of polyethylene, polypropylene, polystyrene, polylactic acid, polyethylene terephthalate, ABS, silicones, polyethylene glycols, poly-vinylacetates, poly-caprolactones, and combinations thereof.

In certain particular (but non-limiting) embodiments, the controlled-release delivery composition contains two or more matrix materials, such as (but not limited to), three or more, four or more, five or more, six or more, seven or more, eight or more, nine or more, ten or more, 11 or more, 12 or more, 13 or more, 14 or more, 15 or more, 16 or more, 17 or more, 18 or more, 19 or more, 20 or more, 21 or more, 22 or more, 23 or more 24 or more, 25 or more, 26 or more, 27 or more, 28 or more, 29 or more, 30 or more, 35 or more, 40 or more, 45 or more, or 50 or more matrix materials. When two or more matrix materials are present, the materials may be from the same class of compounds (i.e., emulsifier, wax, polymer, ceramic, etc.) or from a combination of classes of compounds.

The matrix material(s) may be present in the controlled-release delivery composition/system at any percentage of concentration that allows the composition to function as described or as otherwise contemplated herein. For example (but not by way of limitation), each carrier or film-forming material may be present in the composition at a percent concentration of about 0.001%, about 0.005%, about 0.01%, about 0.05%, about 0.1%, about 0.5%, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, or higher. In addition, the scope of the presently disclosure also includes the presence of each matrix material in the composition at any percent concentration that falls within any range formed from the combination of two values listed above (for example, a range of from about 0.01% to about 90%, a range of from about 0.05% to about 50%, a range of from about 0.1% to about 50%, a range of from about 0.1% to about 20%, etc.).

When present, the solvent (or thinning agent) of the controlled-release delivery composition/system for extending the life of at least one produce item in the presently disclosed and/or claimed inventive concept may be chosen from a group consisting of an alcohol, an oil, water, or combinations thereof. In some non-limiting embodiments, water may be used in combination with at least one salt as the solvent. In some non-limiting embodiments, the polar solvents may be chosen from a group consisting of ethanol, glycerol, isopropyl alcohol, acetone, ethyl acetate, benzyl alcohol, 1,3-butylene glycol, glyceryl diacetate, glyceryl triacetate, glyceryl tributyrate, triethyl citrate, and combinations thereof. In some non-limiting embodiments, the oil may be chosen from a group consisting of canola oil, grapeseed oil, avocado oil, walnut oil, coconut oil, soybean oil, palm oil, hydrogenated oils, paraffins oil, peanut oil, almond oil, sesame oil, safflower oil, and combinations thereof. The concentration of the oil in the controlled-release delivery composition/system may be in a range of about 40% to about 98%. The solvents may modify a physical state of the controlled-release delivery composition/system. The physical state affected by the addition of a solvent may be the conversion of the controlled-release delivery composition/system from a liquid-like state to a solid-like state, solid-like state to a liquid, from a liquid-like state to a vapor state, from a vapor state to a liquid-like state, or the like.

In certain particular (but non-limiting) embodiment, the controlled-release delivery composition contains two or more solvents, such as (but not limited to), three or more, four or more, five or more, six or more, seven or more, eight or more, nine or more, or ten or more solvents. When two or more solvents are present, the solvents may be from the same class of compounds (i.e., alcohol, an oil, water, etc.) or from a combination of classes of compounds.

The solvent(s) may be present in the controlled-release delivery composition/system at any percentage of concentration that allows the composition to function as described or as otherwise contemplated herein. For example (but not by way of limitation), each solvent may be present in the composition at a percent concentration of about 0.001%, about 0.005%, about 0.01%, about 0.05%, about 0.1%, about 0.5%, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or higher. In addition, the scope of the presently disclosure also includes the presence of each solvent in the composition at any percent concentration that falls within any range formed from the combination of two values listed above (for example, a range of from about 0.01% to about 95%, a range of from about 0.1% to about 59%, etc.).

In non-limiting embodiments, the controlled-release delivery composition/system further comprises at least one release-rate modifying agent. The release-rate modifying agent may be selected from the group consisting of a sodium salt, potassium salt, magnesium salt, calcium salt, macrocycles, ferrous fumarate, iron pyrophosphate, ferrous sulfate, ferrous fluconate, ammonium bicarbonate, ammonium sulfate, guanidinium chloride, and combinations thereof. The macrocycles may be chosen from a group consisting of alpha-cyclodextrin, beta-cyclodextrin, gamma-cyclodextrin, muscone, civetone, crown ether, and combinations thereof. In some non-limiting embodiments, the release-rate modifying agent may be combined with at least one ceramic in powdered form (where in the powdered ceramic is separate from the solid or semi-solid ceramic that may be present in the matrix). The powdered ceramic may be selected from the group consisting of alumina, silica, zeolite, clay, bentonite, montomorillonite, illite, vermiculite, talc, titanium oxide, silicon dioxide, and combinations thereof. The release rate modifying agent may affect the vaporization rate of the shelf-life extending agent via changing the equilibrium vapor pressure of the shelf-life extending agent.

In certain particular (but non-limiting) embodiment, the controlled-release delivery composition contains two or more release-rate modifying agents, such as (but not limited to), three or more, four or more, five or more, six or more, seven or more, eight or more, nine or more, or ten or more agents. When two or more release-rate modifying agents are present, the agents may be from the same class of compounds or from a combination of classes of compounds.

The release-rate modifying agent(s) may be present in the controlled-release delivery composition/system at any percentage of concentration that allows the composition to function as described or as otherwise contemplated herein. For example (but not by way of limitation), each release-rate modifying agent may be present in the composition at a percent concentration of about 0.001%, about 0.005%, about 0.01%, about 0.05%, about 0.1%, about 0.5%, about 1%, about 2%, about 3%, about 4%, about 5%, about 6%, about 7%, about 8%, about 9%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, or higher. In addition, the scope of the presently disclosure also includes the presence of each release-rate modifying agent in the composition at any percent concentration that falls within any range formed from the combination of two values listed above (for example, a range of from about 0.01% to about 95%, a range of from about 0.1% to about 59%, etc.).

In other non-limiting embodiments, the controlled-release delivery composition/system may have a nanostructure and/or a microstructure. The microstructure may be an amorphous microstructure, semicrystalline microstructure, microemulsion microstructure, microporous microstructure, mesoporous microstructure, fibrous microstructure, foam microstructure, and combinations thereof. In one non-limiting embodiment, when the matrix of the controlled-release delivery composition/system is comprised of polymers the controlled-release delivery composition/system may have a semicrystalline microstructure, wherein the matrix has a crystallinity between 0% to about 80%. The crystallinity and crystal grain structure of the controlled-release delivery composition/system may allow the at least one shelf-life extending agent to have varying rates. In one non-limiting example, a controlled-release delivery composition/system having a higher crystallinity may result release rate of the at least-one shelf-life extending compound.

In one non-limiting embodiment, the controlled-release delivery composition/system has a microemulsion-microstructure. For example, the microemulsion microstructure may be a vesicle, micelle, or at least one bilayer sheet. The vesicle microemulsion-microstructure may be spherical, cylindrical, gyroid, or the like. The microemulsion-microstructure of the controlled-release delivery composition/system may have a size range of about 10 nm to about 500 μm. The micelle microemulsion-microstructure may have a size of about 10 nm. A large vesicle microemulsion-microstructure may have a size of 500 μm. The shape, size, and distribution of the microemulsion-microstructure of the controlled-release delivery composition/system may affect the release rate of the at least one shelf-life extending agent. Specifically, a smaller or more tortuous structures of the microemulsion-microstructure may slow the release rate of the at least one shelf-life extending agent versus a larger more open structure of the microemulsion-microstructure may allow the at least one shelf-life extending agent to have a higher release rate.

In other non-limiting embodiments, the controlled-release delivery composition/system may have a porous solid structure. In other non-limiting embodiments, the controlled-release delivery composition/system may comprise a porous activated carbon. In other non-limiting embodiments, the porous solid structure of the controlled-release delivery composition/system may be a microporous or mesoporous solid structure. The controlled-release delivery composition/system having a mesoporous solid structure may comprise, but is not limited to, mesoporous silica gel. The controlled-release delivery composition/system having a microporous solid structure may comprise, but is not limited to, microporous alumina, also known as anodized aluminum. The porous solid structure of the controlled-release delivery composition/system may have a porous size in a range of from about 10 nm to about 500 μm.

In other non-limiting embodiments, the controlled-release delivery composition having the fibrous microstructure may be selected from the group consisting of paper comprising a fiber comprising a network of cellulose, felt comprising a fiber network of keratin, linen comprising a fiber network of cotton. The fibrous microstructure comprising cotton may be selected from the group consisting of cellulose, wax, protein, or combinations thereof. In certain non-limiting embodiments, the controlled-release delivery composition/system having a foam microstructure may of a sponge, cork, expanded polystyrene, sponge comprised of polystyrene, and a combination thereof. The cork material may comprise lignin and cellulose. In certain non-limiting embodiments, the controlled-release delivery composition/system may have two or more microstructures. In one embodiment, the microstructure may one microstructure positioned within another microstructure. By way of example, but in no way limiting, a microporous microstructure may be positioned within the matrix having a solid or gel-like state. By way of example, but in no way limiting, a particle microstructure may be positioned within a ceramic. In another non-limiting example, a wax microstructure may be positioned within a solid or gel-like controlled-release delivery composition/system. The microcrystals may have a size between about 100 nm to about 1 mm.

In certain particular (but non-limiting) embodiments, the controlled-release delivery composition is edible. In certain other particular (but non-limiting) embodiments, the controlled-release delivery composition is non-edible.

In certain particular (but non-limiting) embodiments, the controlled-release delivery composition comprises an adhesive or other bonding material disposed on at least a portion of a lower surface thereof for releasably attaching the controlled-release delivery composition to at least one produce item.

Certain non-limiting embodiments of the present disclosure are directed to an assembly that includes at least one produce item in combination with at least one of any of the controlled-release delivery compositions disclosed or otherwise contemplated herein. In particular (but non-limiting) embodiments, the controlled-release delivery composition is positioned/disposed on at least a portion of at least one surface of the at least one produce item (such as, but not limited to, in the form of a sticker). In other particular (but non-limiting) embodiments, Certain non-limiting embodiments of the present disclosure are directed to a method for positioning the controlled-release delivery composition/system in the environment adjacent the at least one produce item in order to protect the at least one produce item from degradation and decomposition (e.g., spoilage) and extend the life of the at least one produce item. The controlled-release delivery composition/system may be positioned in the environment within a container or may positioned on the container in which the at least one produce item is positioned. For example, the controlled-release delivery composition/system may be positioned on at least one side wall of the container in which at least one produce item is positioned. The controlled-release delivery composition/system may further comprise a sticker in combination with the controlled-release delivery composition/system, wherein the sticker is positioned on at least one internal surface of the container to allow for the release of the at least-one shelf life extending agent into the environment adjacent the at least one produce item. In another non-limiting embodiment, the controlled-release delivery composition/system may be positioned in a satchel that has a porous structure through which the at least one shelf-life extending agent of the controlled-release delivery composition/system may diffuse.

Other non-limiting embodiments of the present disclosure are directed to a method for positioning the controlled-release delivery composition/system on at least one surface of the at least one produce item in order to protect the at least one produce item from degradation and decomposition (e.g., spoilage) and extend the life of the at least one produce item. For example, the controlled-release delivery composition/system may be in combination with a sticker, wherein the sticker is positioned on at least one surface of the at least one produce item thereby allowing for the release of the at least one shelf-life extending agent into the environment adjacent the at least one produce item. In other embodiments, the positioning of the at least one sticker on the at least one surface of the at least one produce item may affect the at least one produce item directly as disclosed above.

EXAMPLES

Examples are provided hereinbelow. However, the present disclosure is to be understood to not be limited in its application to the specific experimentation, results, and laboratory procedures disclosed herein after. Rather, the Examples are simply provided as one of various embodiments and are meant to be exemplary, not exhaustive.

Example 1

A molecular diffusivity of 1.4E-12 m$^2$/s for shelf-life extending agent through a matrix comprising a beeswax was previously estimated from experimental data. The simulation varies diffusivity of the at least one shelf-life extending agent through the matrix of the controlled-release delivery composition/system and measures the net concentration increase of the shelf-life extending compound in a container over time. The higher the molecular diffusivity of the at least one-shelf life extending agent, the higher the release-rate of the at least one shelf-life extending agent.

FIG. 1 illustrates the positioning of an exemplary 2.24 cm by 0.45 cm controlled-release delivery composition/system positioned within an exemplary 10 cm by 10 cm container. For the purposes of this example, the controlled-release delivery composition/system is assumed to be infinitely volatile; i.e., the controlled-release delivery composition/system will convert form a solid phase into the gaseous phase from the surface of the carrier given enough time.

Figure 2:
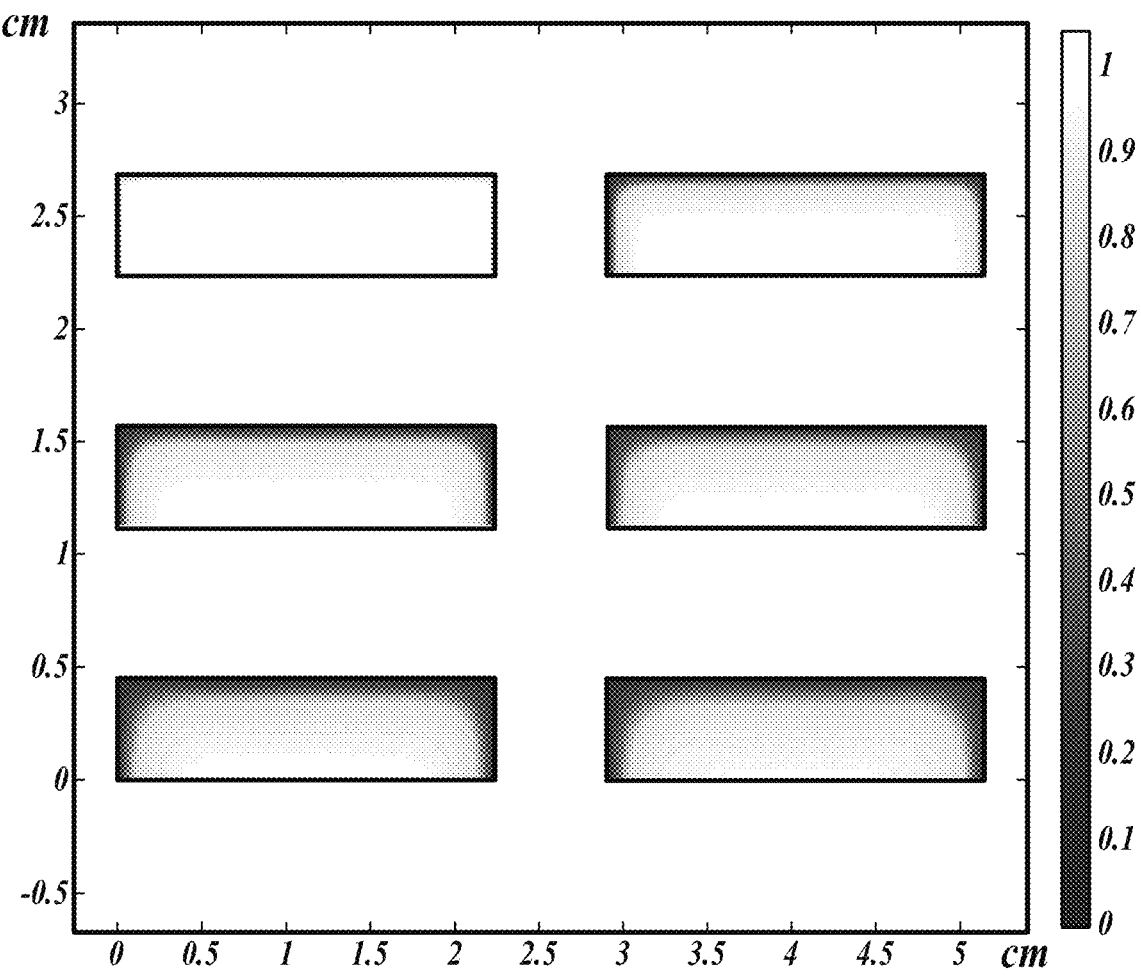
FIG. 2 depicts plots of concentrations of the at least one shelf-life extending agent of the controlled-release delivery composition/system at varying diffusivities over a 72-hour time period.

FIG. 2 depicts plots of concentrations of the at least one shelf-life extending agent of the controlled-release delivery composition/system at varying diffusivities over a 72-hour time period.

Figure 3:
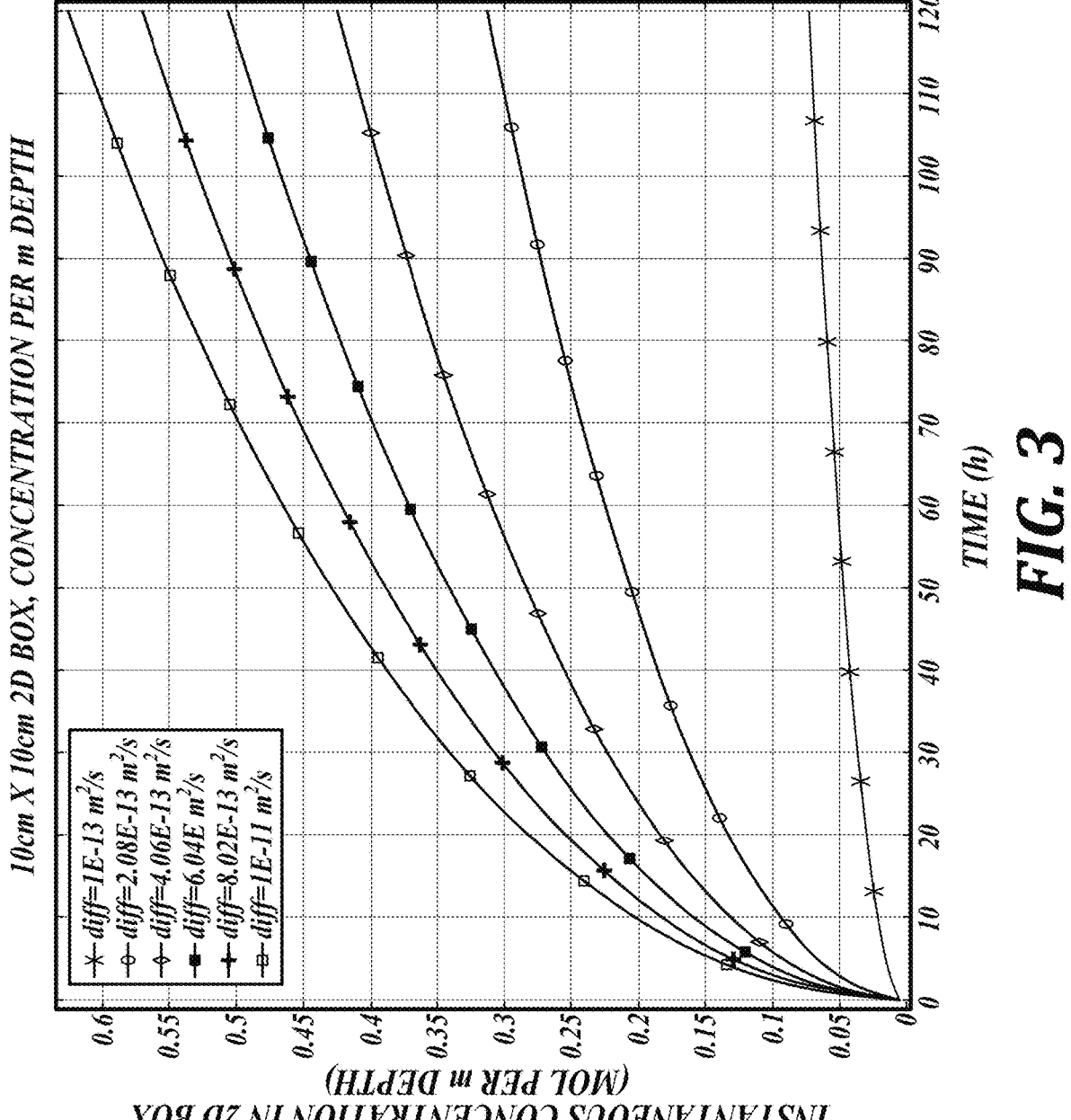
FIG. 3 depicts plots of the resultant vapor pressure concentration of the at least one shelf-life extending agent over time, thereby illustrating the diffusivity of the at least one shelf-life extending agent through the matrix controls the release rate of the shelf-life extending agent.

FIG. 3 depicts plots of the resultant vapor pressure concentration of the at least one shelf-life extending agent over time, thereby illustrating the diffusivity of the at least one shelf-life extending agent through the matrix controls the release rate of the shelf-life extending agent.

Example 2

The data in this Example illustrates the carrying capacity of the at least one shelf-life extending agent of the controlled-release delivery composition/system having various microstructures. Tables 1-3 illustrate the amount of one shelf-life extending agent that is absorbed by the matrix having a particular microstructure.

TABLE 1

| Matrix Material | Capacity (µL C59 compound/g of material) |
|---|---|
| cork | 1.333 |
| felt | 2.500 |
| kraft paper | 375 |
| watercolor paper | 444 |
| borosilicate glass fiber filter paper | 5357 |
| cellulose matrix | 4286 |
| viton | 9.5 |

TABLE 2

| Matrix Material | Capacity (µL C37 compound/g material) |
|---|---|
| silicone | 180 |
| PVC | 90 |
| nylon | 215 |

TABLE 3

| Matrix Material | Capacity (µL C6 compound/g material) |
|---|---|
| silicone | 143 |
| PVC | 180 |
| nylon | 0 |

Table 4 below illustrates the amount of two or more shelf-life extending agent in combination with a solvent that are absorbed by the matrix having a particular microstructure.

TABLE 4

| Matrix Material | Solvent | Capacity (µL carrier/g material) |
|---|---|---|
| Cellulose matrix | 4 w % compound in grapeseed oil | 7143 |
| Cellulose matrix | 4 w % compound in fatty acid salt emulsion | 4286 |

Example 3

Figure 4:
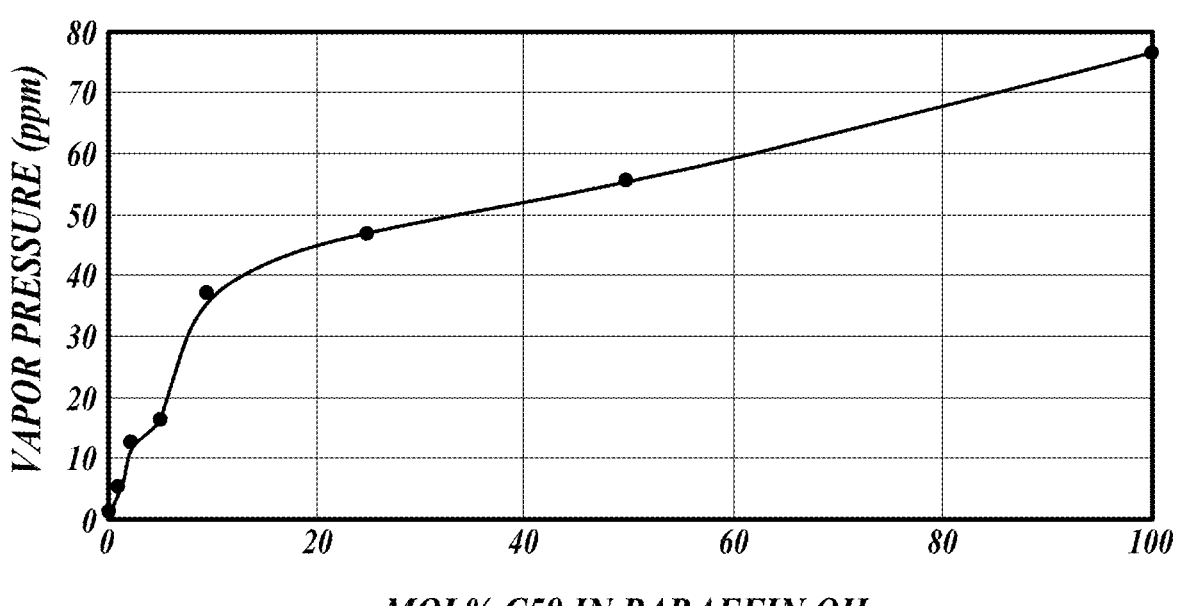
FIG. 4 is a graphical depiction of the effect that the concentration of the at least one shelf-life extending agent (C59) in combination with paraffin oil has on the equilibrium vapor pressure.
Figure 5:
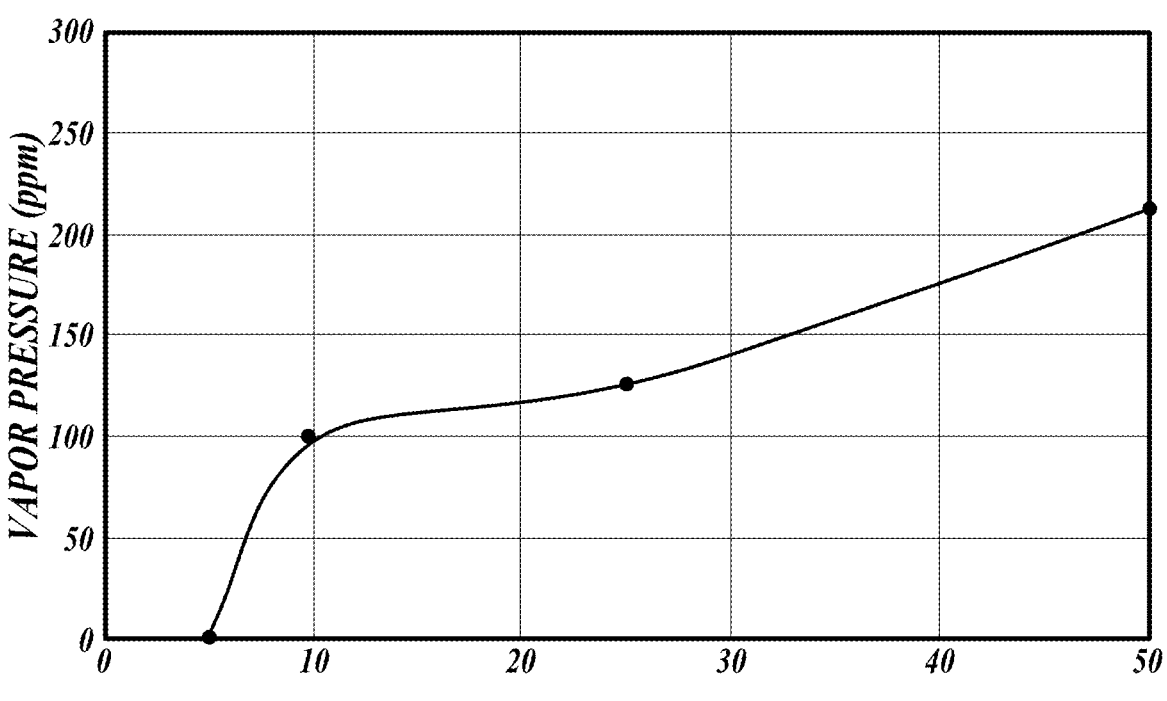
FIG. 5 is a graphical depiction of the effect that the concentration of the at least one shelf-life extending agent (C63) in combination with paraffin oil has on the equilibrium vapor pressure.
Figure 6:
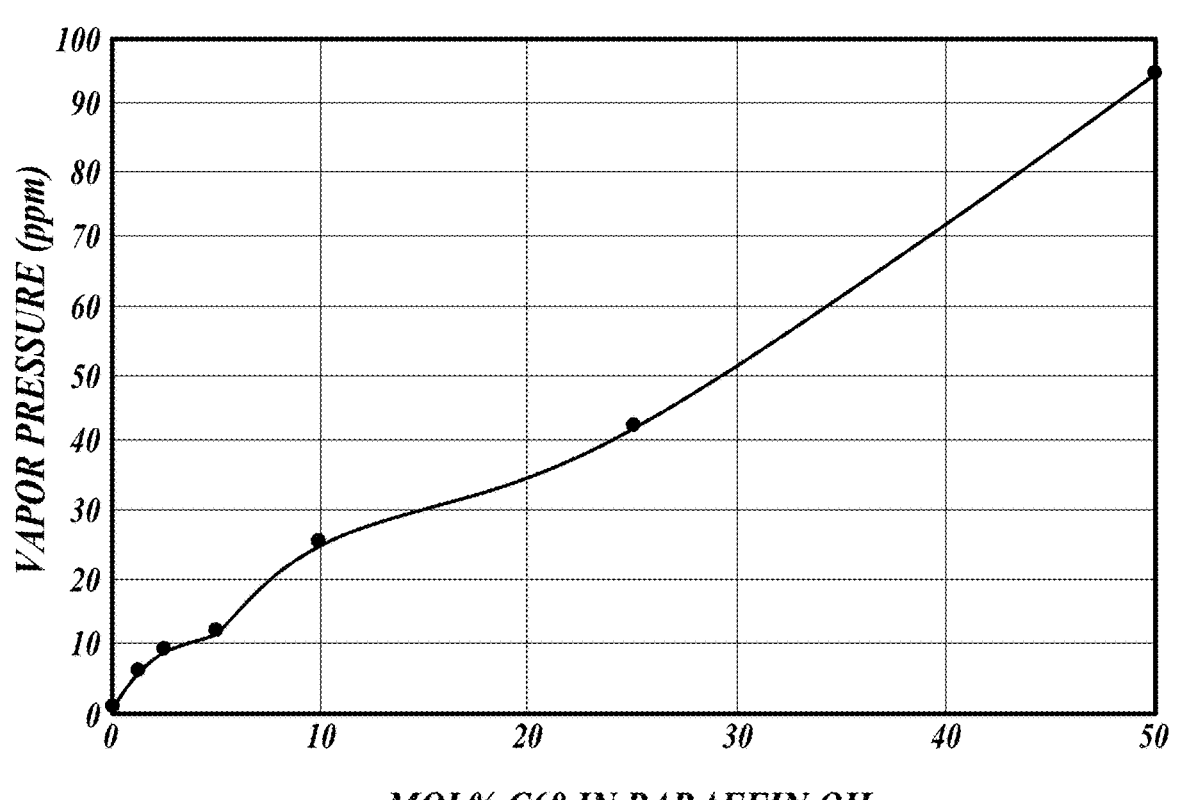
FIG. 6 is a graphical depiction of the effect that the concentration of the at least one shelf-life extending agent (C68) in combination with paraffin oil has on the equilibrium vapor pressure.

The following example illustrates how the diffusivity of the at least one shelf-life extending agent when in combination with a solvent affects the equilibrium vapor pressure. Diluting the at least one shelf-life extending agent a solvent or a gel-like matrix changes the equilibrium vapor pressure of the at least one shelf-life extending agent. The modification of the volatility at least one shelf-life extending agent depends on entropy (the dilution factor) and enthalpy (the chemical affinity between the at least one shelf-life extending agent and the solvent and matrix). The interplay between these factors requires empirical measurements. As, such the equilibrium vapor pressure is modified varying combinations of the at least one shelf-life extending agent, matrix, solvent, and release-rate modifying compound. Specific examples include at least one shelf-like extending agent in combination with a solvent, wherein the solvent it selected from a group consisting of paraffin oil, grapeseed oil, wax oleogel, and agar hydrogel. FIGS. 4-6 are graphical depictions of the effect that the concentration of the at least one shelf-life extending compound in combination with paraffin oil has on the equilibrium vapor pressure.

Figure 7:
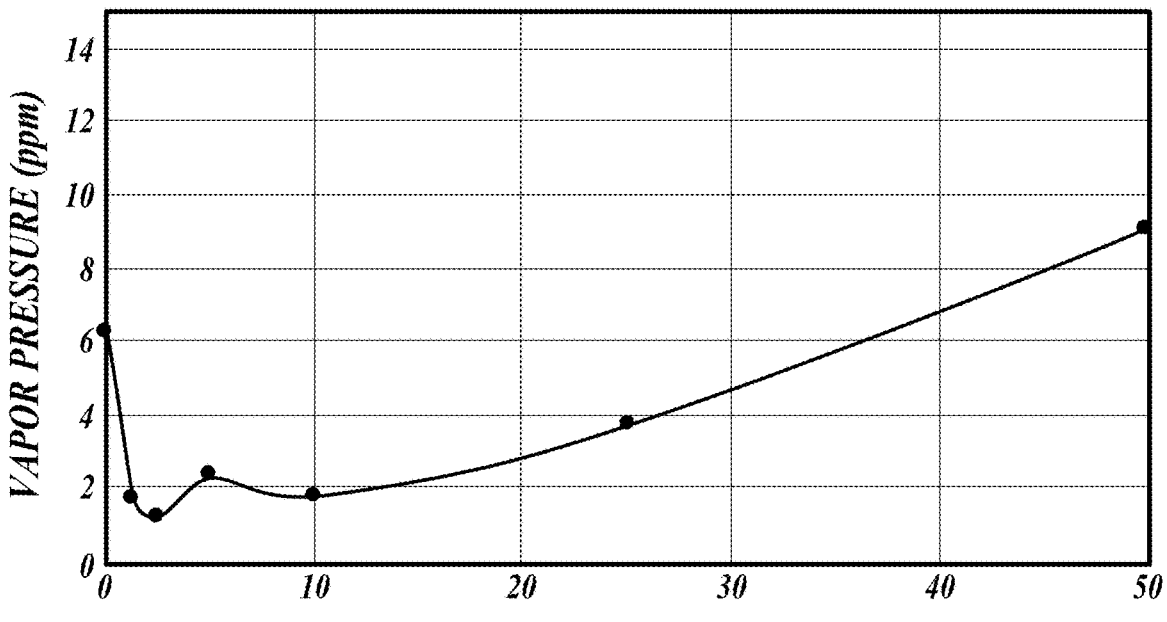
FIG. 7 is a graphical depiction of the effect that the concentration of the at least one shelf-life extending agent (C37) in combination with grapeseed oil has on the equilibrium vapor pressure.
Figure 8:
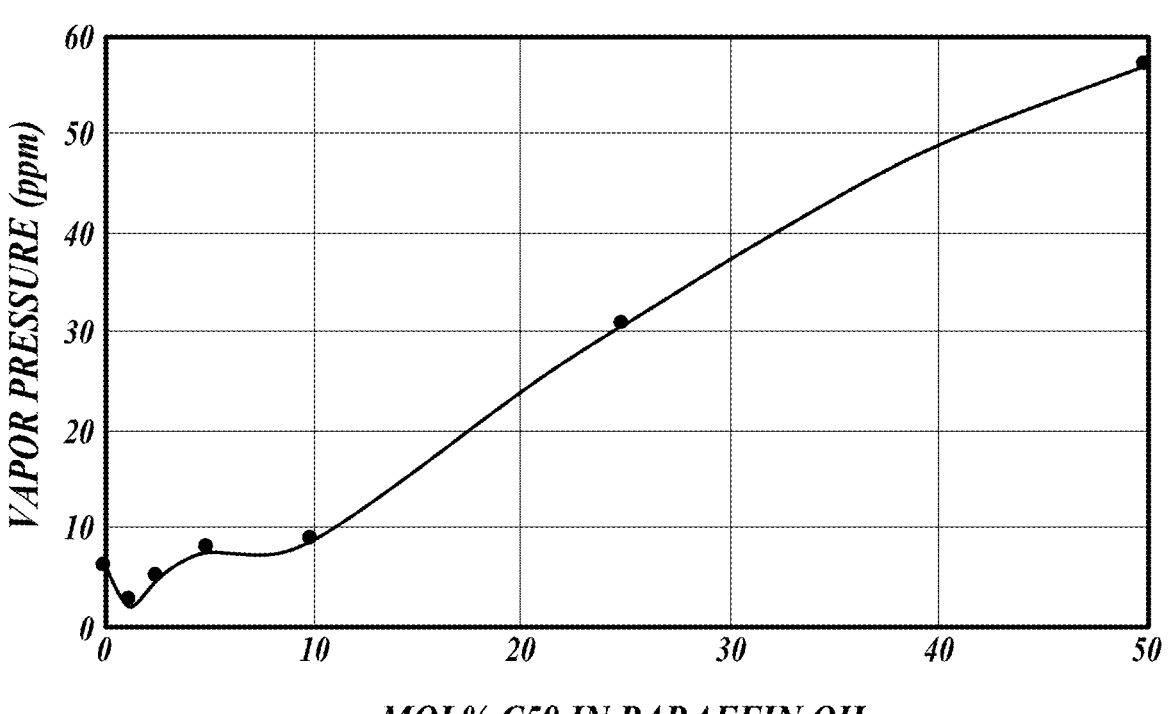
FIG. 8 is a graphical depiction of the effect that the concentration of the at least one shelf-life extending agent (C59) in combination with grapeseed oil has on the equilibrium vapor pressure.
Figure 9:
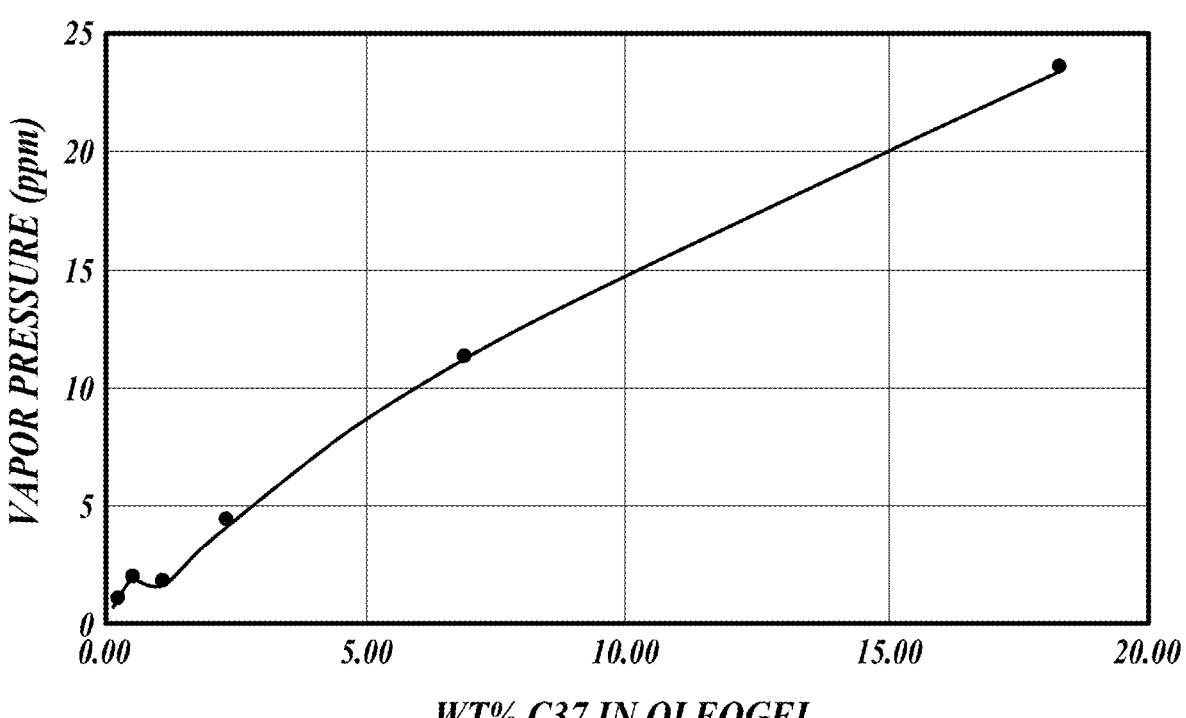
FIG. 9 graphical depiction of the effect that the concentration of the at least one shelf-life extending agent (C37) in combination with a matrix, solvent, and a release-rate modifying agent has an effect on the equilibrium vapor pressure.
Figure 10:
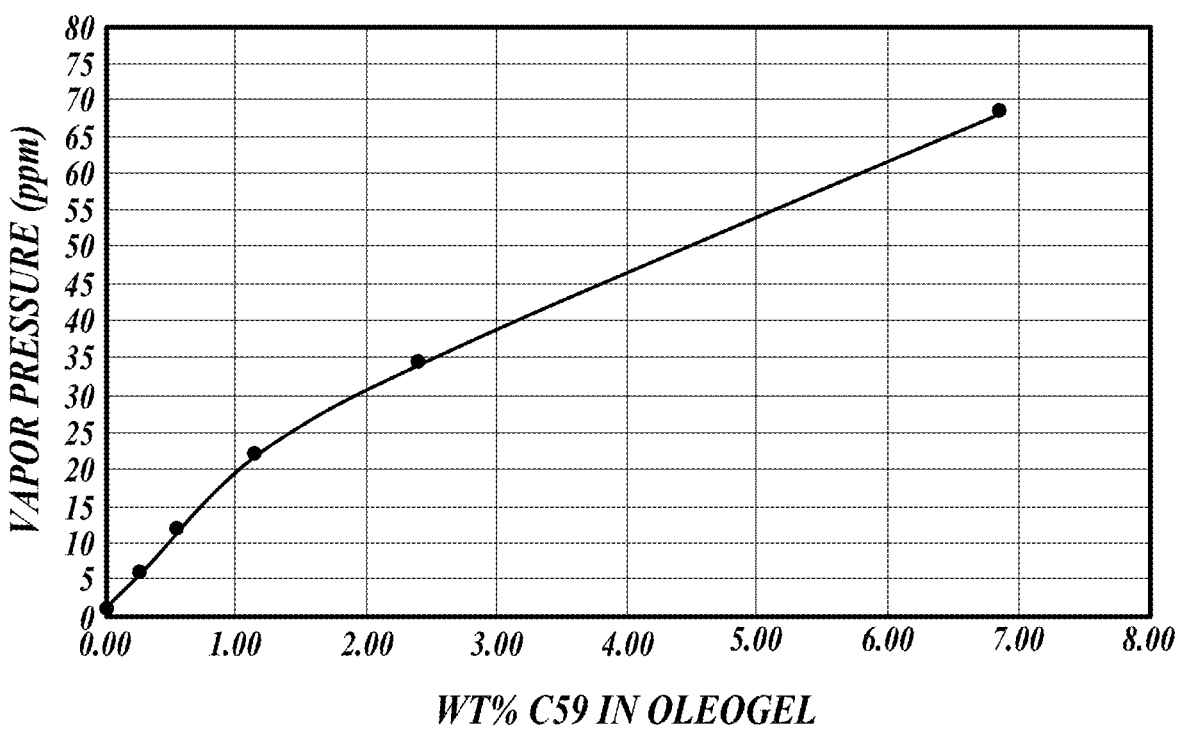
FIG. 10 graphical depiction of the effect that the concentration of the at least one shelf-life extending agent (C59) in combination with a matrix, solvent, and a release-rate modifying agent has an effect on the equilibrium vapor pressure.
Figure 11:
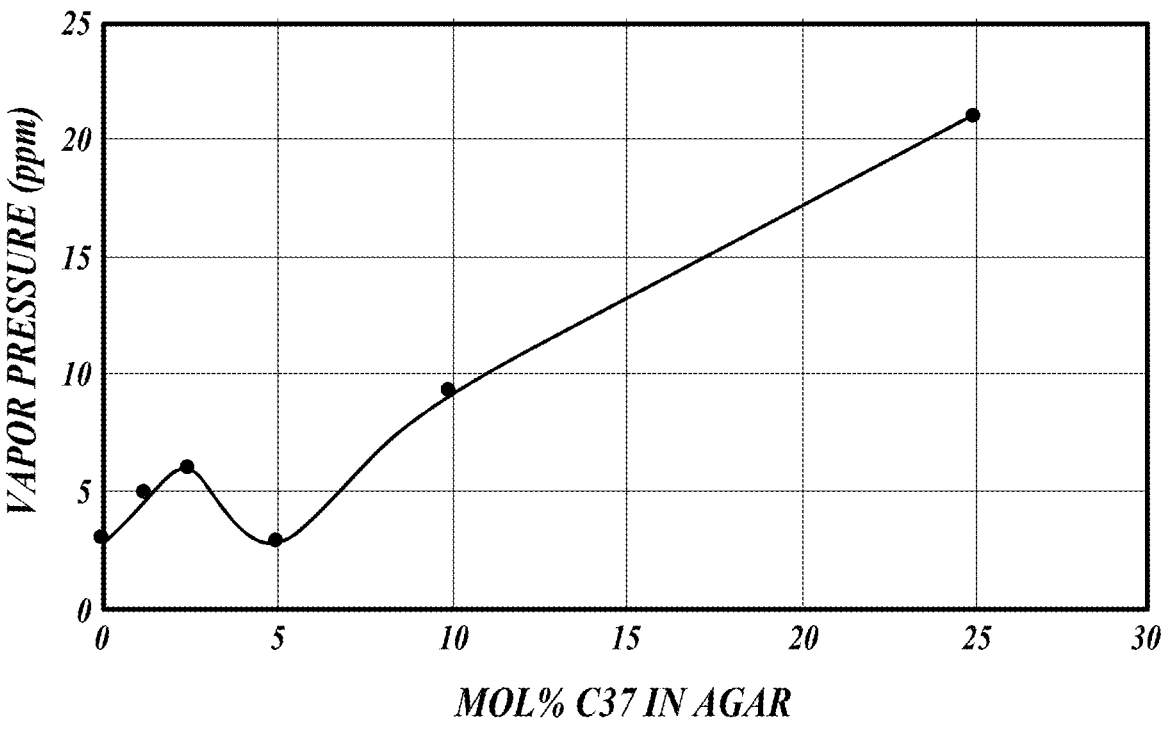
FIG. 11 graphical depiction of the effect that the concentration of the at least one shelf-life extending agent (C37) in combination with a matrix and solvent have on the equilibrium vapor pressure.
Figure 12:
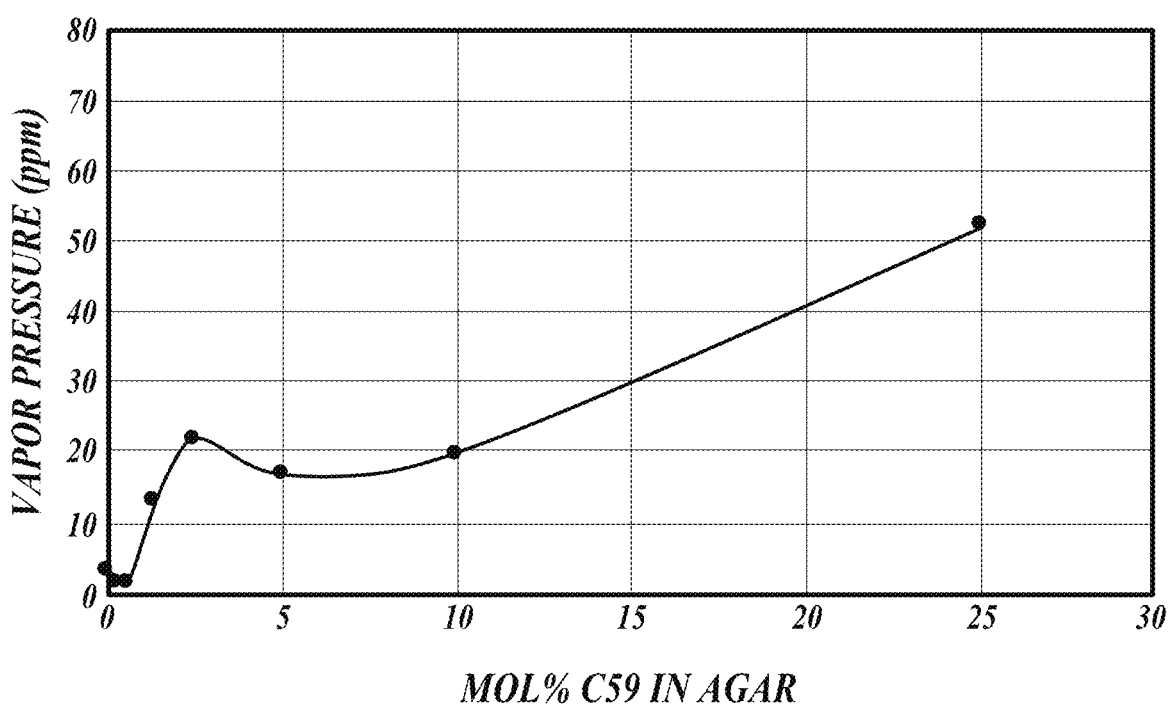
FIG. 12 graphical depiction of the effect that the concentration of the at least one shelf-life extending agent (C59) in combination with a matrix and solvent have on the equilibrium vapor pressure.

FIGS. 7 and 8 are graphical depictions of the effect that the concentration of at least one shelf-life extending compound in combination with grapeseed oil have on the equilibrium vapor pressure. FIGS. 9 and 10 are graphical depiction of the effect that the concentration of the at least one shelf-life extending agent in combination with a matrix, solvent, and a release-rate modifying agent has an effect on the equilibrium vapor pressure. The matrix material is oleogel. FIGS. 11 and 12 are graphical depictions of the effect that the concentration of the at least one shelf-life extending agent (C59) in combination with a matrix and solvent have on the equilibrium vapor pressure. The matrix is an agar and the solvent is water.

Example 4

Polymer films are used to absorb and release the at least one shelf-life extending agent. The chemistry of polymers and mechanical properties of polymers affects the release-rate of the matrices. In the following examples, matrices of polymer films were exposed to at least one shelf-life extending agent in a vapor physical state. The vapor is absorbed by the polymer film and the amount of at least one shelf-life extending agent was measured. Various combinations of shelf-life extending agents, matrices, solvents, and/or release-rate modifying agents allows additional ability to tune vapor pressures. The following are measurements comparing the equilibrium vapor pressure of pure, single shelf-life extending agents to the vapor pressure of the same pure, single shelf-life extending agents in combination with matrices having a polymer microstructure.

TABLE 5

| Sample | Vapor Pressure (ppm) |
|---|---|
| pure C18 compound | 270 |
| C18 compound release from previously exposed polypropylene bag material | 25 |
| pure C59 compound | 75 |
| C59 compound release from previously exposed from previously exposed MAP bag material | 0.6 |

Example 5

The material that comprises the matrix affects the overall loaded matrix composite vapor pressure. Generally, matrices are not chemically inert, and interact with at least one shelf-life extending agent and matrix components, especially when the matrix components are in a liquid or emulsion state and can diffuse relatively easily. The chemistry of matrices can therefore modulate the interactions between at least one shelf-life extending agent and matrix components, changing the overall vapor pressure of the at least one shelf-life extending agent, as well as the release kinetics of the controlled-release delivery composition/system. The following illustrates a variety of matrix materials and how they interact with certain pure at least one shelf-life extending agent, as well as at least one shelf-life extending agent in emulsion or oil carrier. By measuring and comparing the equilibrium vapor pressures of pure at least one shelf-life extending compound wicked onto different matrix materials, the chemical affinity for each surface for the compound was indirectly measured. A lower equilibrium vapor pressure corresponds to a higher affinity and vice versa. By measuring and comparing the equilibrium vapor pressures of pure compounds wicked onto different matrix materials, we can indirectly measure the chemical affinity each surface has for the compound. A lower equilibrium vapor pressure corresponds to a higher affinity and vice versa. Table 6 illustrates the equilibrium vapor pressure of a pure at least one shelf-life extending agent applied to a single-component matrix material with no intermediate matrix.

TABLE 6

| Substrate (Fiber Matrix) Material | C59 Eq. Vapor Pressure (ppm) |
|---|---|
| Activated Carbon | ~0 |
| Activated Silica (silica gel) | ~0 |
| AB Disc (treated paper) | 39 |
| Cork (lignin) | 43 |
| Zeolite (nanoporous ceramic) | 44 |
| Wool Felt (keratin) | 56 |
| Bamboo Felt (cellulose) | 66 |
| Porous Sponge (cellulose) | 72 |
| Filter Paper (borosilicate glass fibers) | 75 |

Table 7 illustrates the measurements of the equilibrium vapor pressure of at least one shelf-life extending agent in a matrix material comprising at least two matrix components in combination with a thinning agent.

TABLE 7

| Carrier + Matrix Composite System | C59 Eq. Vapor Pressure (ppm) |
|---|---|
| 4 w % emulsion on silica gel, dried | ~0 |
| 0.3 w % emulsion in activated carbon, dried | 1.7 |
| 2 w % emulsion in activated carbon, dried | 6.5 |
| 4 w % in natural oil in porous sponge (cellulose) | 7.7 |
| 4 w % emulsion in polypropylene matrix | 8.4 |
| 8 w % emulsion in polypropylene matrix | 10.8 |
| 4 w % emulsion in filter paper (borosilicate glass fibers) | 13.8 |
| 4 w % emulsion in porous sponge (cellulose) | 18.5 |
| 5 w % emulsion in ceramic matrix | 39 |
| 4 w % oil emulsion in wax matrix | 40 |
| 4 w % emulsion on Cork (lignin) | 100 |
| 4 w % emulsion on Felt (wool, keratin) | 108 |

Example 6

Further modification of equilibrium vapor pressures was achieved by the addition of salts or polyelectrolytes, which modify the interactions between the matrix surface chemistry and the matrix components. For example, emulsion on activated silica, emulsion on $CaCl_2$) salt treated activated silica, and emulsion on chitosan treated activated silica resulted in different equilibrium vapor pressures. Table 8 illustrates the measurement of equilibrium vapor pressures of at least one shelf-life extending agent in different matrices and further illustrates the effects of different composites or release-rate modifying agents. Examples of controlled-release delivery composition/systems are emulsion on silica, emulsion and salt on silica, emulsion and chitosan on silica; and emulsion on cork with salt, emulsion on cork without salt, emulsion on felt with salt, and emulsion on felt without salt.

TABLE 8

| Processed Substrate Material | C59 Eq. Vapor Pressure (ppm) |
| --- | --- |
| 4 w % emulsion on silica gel, dried | ~0 |
| silica gel treated with CaCl₂ brine, dried, coated with 4 w % emulsion, dried | 50.1 |
| silica gel treated with chitosan solution, dried, coated with 4 w % emulsion, dried | 13.7 |

In general, small salt ions initially on the matrix surface tend to mix into the emulsion carrier, modifying the affinity for the encapsulated at least one shelf-life extending agent and changing the controlled-release delivery composition/system equilibrium vapor pressure. For chaotropic salts, like $CaCl_2$), decrease interactions between the at least one shelf-life extending agent and the matric components, increasing the controlled-release delivery composition/system vapor pressure. A non-limiting example is the increase in the equilibrium vapor pressure (from ~0 ppm to 50 ppm) of the silica matrix when treated with $CaCl_2$) brine. For kosmotropic salts, like ammonium sulfate or potassium citrate increase interactions between the at least one shelf-life extending agent and matrix components, likely decreasing the equilibrium pressure of the controlled-release delivery composition/system. In the case of polyelectrolytes, like chitosan, the effect is different. Large molecules will not easily leave the surface of the matrix, especially if there are strong affinities between the matrix and polyelectrolyte. In the case of silica (net negative surface charge) and chitosan (net positive charge), the chitosan will form an interacting barrier layer on the silica, reducing the affinity of silica affinity for the emulsion matrix and the at least one shelf-life extending agent. This results in an at least equilibrium vapor pressure being higher than on a bare matrix comprising silica, but a lower equilibrium vapor pressure than a $CaCl_2$) treated matrix comprising silica.

Table 9 illustrates measurements of equilibrium vapor pressures of at least one shelf-life extending agent in combination with matrices, which were processed with and without a release-rate modifying agent.

TABLE 9

| Processed Substrate Material | C59 Eq. Vapor Pressure (ppm) |
| --- | --- |
| 4 w % emulsion on cork | 100 |
| 4 w % emulsion on pre-soaked cork | 19 |
| 4 w % emulsion on felt (wool) | 108 |
| 4 w % emulsion on pre-soaked felt (wool) | 51 |

Cork and wool fibers naturally contain a significant amount of counterions, both from their source raw material and from their processing. By soaking these matrices in water to remove these ions, their surface chemistries could be modified, resulting in modulated at least one shelf-life extending agent vapor pressures. This is another example of salt ions originating from the matrix surface (or lack thereof) modifying the composition of the emulsion carrier and therefore modifying the interactions between the matrix and at least one shelf-life extending agent, which changes the at least one shelf-life extending agent vapor pressure and release rate.

Example 7

Controlled-release materials that consist of a loaded matrix containing the active ingredient formulation and components that solidify the matrix, through a variety of mechanisms, to form a solid matrix composite. An example of an encapsulation emulsion could be a mixture of natural oils, natural fatty acid salts, natural glycerol, water, and the active compounds derived from natural essential oils.

The natural oil could be any oil or fat derived from natural sources, typically primarily composed of triglycerides, such as canola oil, palm oil, coconut oil, sesame oil, or grapeseed oil. In this case, canola oil was used. The natural fatty acid salts could be any combination of positively charged cation, such as sodium, potassium, or magnesium and a natural fatty acid, such as oleic acid, linoleic acid, or palmitic acid. In this case the fatty acid salts were primarily sodium oleate (sodium+oleic acid) and sodium linoleate (sodium+linoleic acid). The essential oil compound or mixture of essential oil compounds can be selected from a list of natural volatile compounds. In this example, thymol and cuminaldehyde were used. The matrix can also contain additive components such as calcium carbonate powder, calcium hydroxide powder, sodium metasilicate, chitosan powder, chitosan gel, collagen powder, collagen gel (gelatin), poly-lysine polymer, shellac, wax, etc., which interact with each other and the active compounds to form a solid or highly viscous material, called a solid matrix composite. A combination of such components was used to achieve the desired mechanical and controlled-release properties of the controlled-release delivery composition/system.

Depending on the ratios of components in the matrix, the carrier can be liquid, solid, or thixotropic (solid until sheared, then undergoing plastic deformation). In the solid or thixotropic case, the active compounds are be added by mixing (high shear, or heated) and upon cessation of mixing the final mixture solidified, producing a solid matrix composite.

Examples of solid or thixotropic matrix include a mixture of water, at least one shelf-life extending agent, fatty acid salts, and gum Arabic, which became a putty during mixing and set as a solid matrix a mixture of the at least one shelf-life extending agent and fatty acid salts, which acted as a soft solid that that can be mixed and extruded, but sets as a solid matrix. In the liquid, gel, or emulsion matrix case, upon combination and mixing of the matrix with additive components, a gel transition or solidification occurs, producing the solid carrier composite. Examples of liquid, gel, or emulsion carriers and additive components include a mixture of water, at least one shelf-life extending compound and fatty acid salts that form a viscous emulsion with additives such as calcium hydroxide, calcium carbonate, or chitosan, which cures as a solid matrix a mixture of oil, at least one shelf-life extending agent, and fatty acid salts that forms a viscous solution with additives such as melted beeswax, which solidifies as a solid matrix a mixture of oil, at least one shelf-life extending agent, and polymer that can be cross-linked to form a solid matrix. Table 10 below illustrates the equilibrium vapor pressure of at least one shelf-life extending agent in two different composite matrices that use two different papers, but the soap portion is the same. The soap portion is a mixture of fatty acid salts and glycerol. Specifically, the controlled-release delivery composition/system is at least one shelf-life extending agent (5%)+glycerol (12%)+fatty acid salts (33%)+paper (50%).

TABLE 10

| Substrate + Composite System | C37 Vapor Pressure (ppm) |
|---|---|
| kraft paper, soap composite | 4 |
| white paper, soap composite | 2.6 |

TABLE 11

| Substrate + Composite System | C37 Vapor Pressure (ppm) |
|---|---|
| kraft paper, emulsion cured with Ca(OH)2 | 2.9 |
| kraft paper, emulsion cured with CaCO3 | 3.1 |
| kraft paper, emulsion cured with chitosan | 6.7 |

Figure 13:
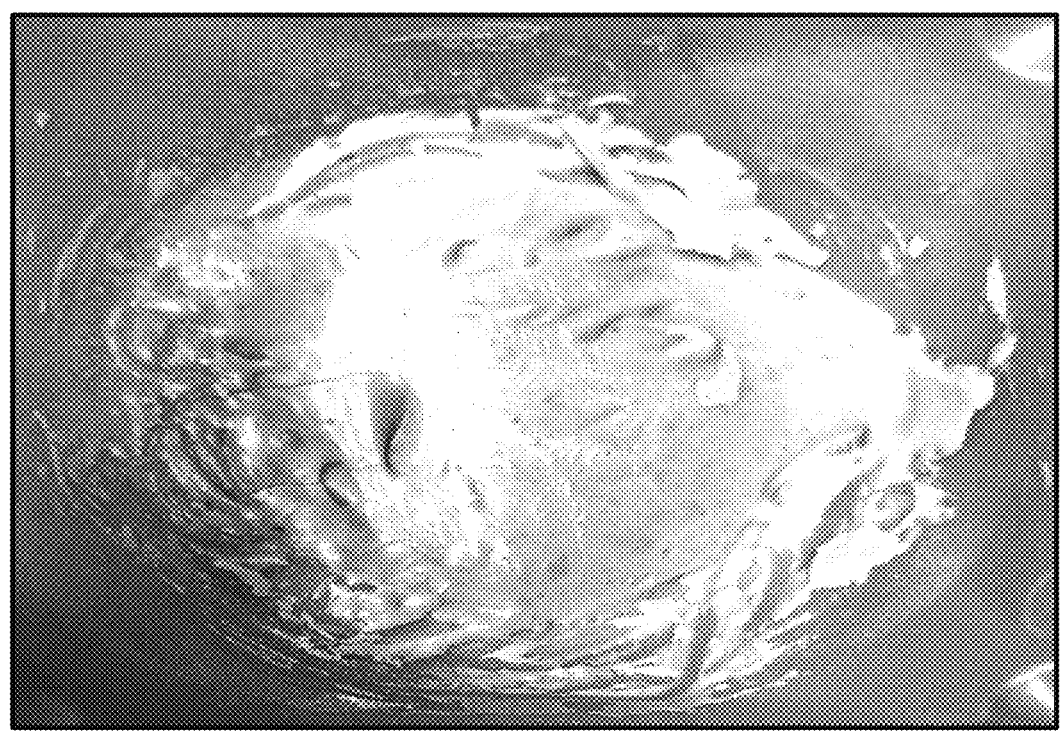
FIG. 13 depicts an exemplary controlled-release delivery composition/system having gum Arabic, water, and fatty acid salts.
Figure 14:
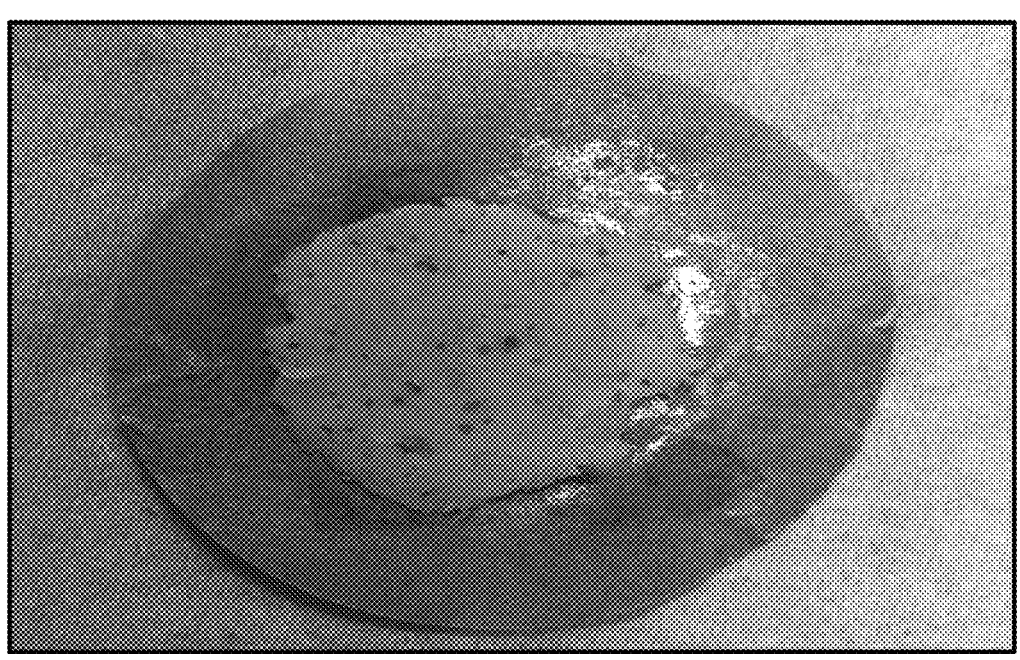
FIG. 14 depicts an exemplary controlled-release delivery composition/system having kraft paper, fatty acid salts, and glycerol.
Figure 15:
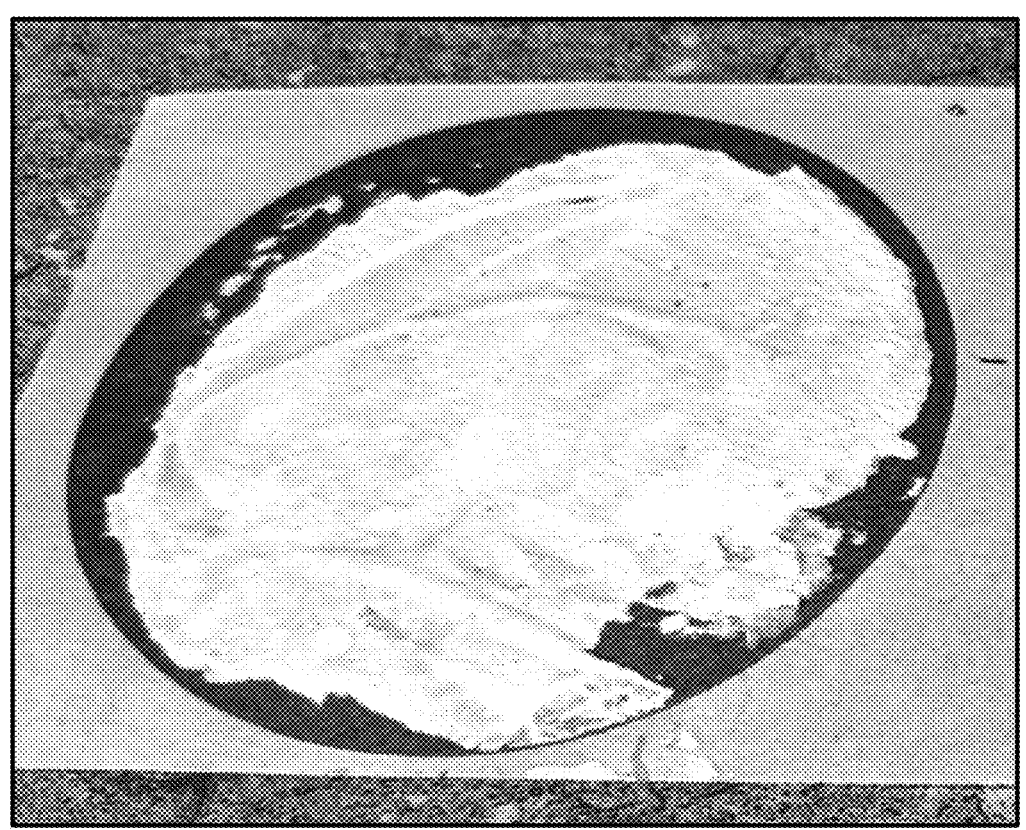
FIG. 15 depicts an exemplary controlled-release delivery composition/system having kraft paper, fatty acid salts, glycerol, and $Ca(OH)_2$.
Figure 16:
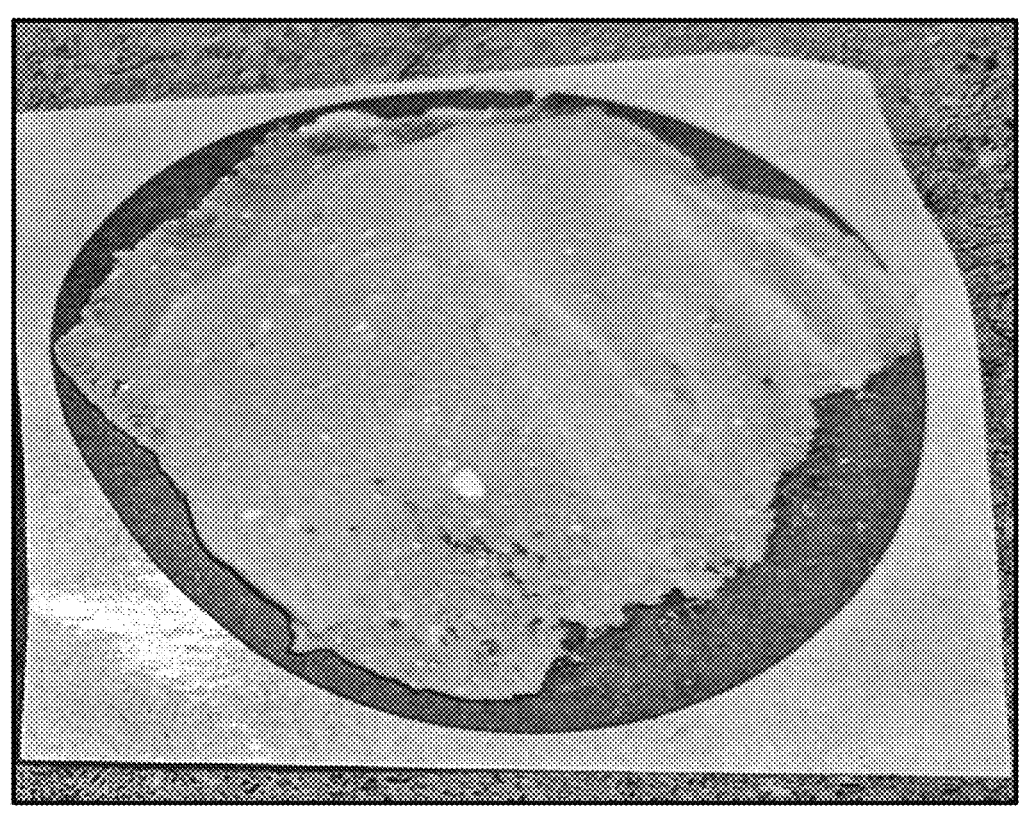
FIG. 16 depicts an exemplary controlled-release delivery composition/system having kraft paper, fatty acid salts, glycerol, $Ca(OH)_2$, and chitosan.
Figure 17:
FIG. 17 depicts an exemplary controlled-release delivery composition/system having kraft paper, fatty acid salts, glycerol, and chitosan.

Table 11 above illustrates the measurements of vapor pressure of at least one shelf-life extending agent in combination with various composite matrices, release-rate modifying agent, and thinning agents. The three composite matrices have different release-rate modifying agents (calcium hydroxide, calcium carbonate, chitosan) and the emulsion comprising fatty acid salts, glycerol, and water. The exemplary controlled-release delivery composition/system is at least one shelf-life extending agent (2%)+glycerol (1%)+fatty acid salts (5%)+water (17%)+release-rate modifying agent (25%)+paper (50%). FIGS. 13-17 depict exemplary examples of the controlled-release delivery composition/system. FIG. 13 depicts an exemplary controlled-release delivery composition/system having gum Arabic, water, and fatty acid salts. FIG. 14 depicts an exemplary controlled-release delivery composition/system having kraft paper, fatty acid salts, and glycerol. FIG. 15 depicts an exemplary controlled-release delivery composition/system having kraft paper, fatty acid salts, glycerol, and Ca(OH)$_2$. FIG. 16 depicts an exemplary controlled-release delivery composition/system having kraft paper, fatty acid salts, glycerol, Ca(OH)$_2$, and chitosan. FIG. 17 depicts an exemplary controlled-release delivery composition/system having kraft paper, fatty acid salts, glycerol, and chitosan.

Example 8

Essential oil compounds encapsulated in oil or an emulsion carrier and absorbed into a matrix comprising fiber or ceramic increase the preservation of at least one produce item. For example, a cellulose matrix, polypropylene matrix, bamboo fiber matrix, felt matrix, and a cork matrix all are effective but differ in the magnitude of the effectiveness. Further, the performance of the controlled-release delivery composition/system is affected by the delivery matrix design. For example, the porosity of the matrix material affects the controlled-release properties of the system; and therefore, the active lifetime of the controlled-release delivery composition/system.

Figure 18:
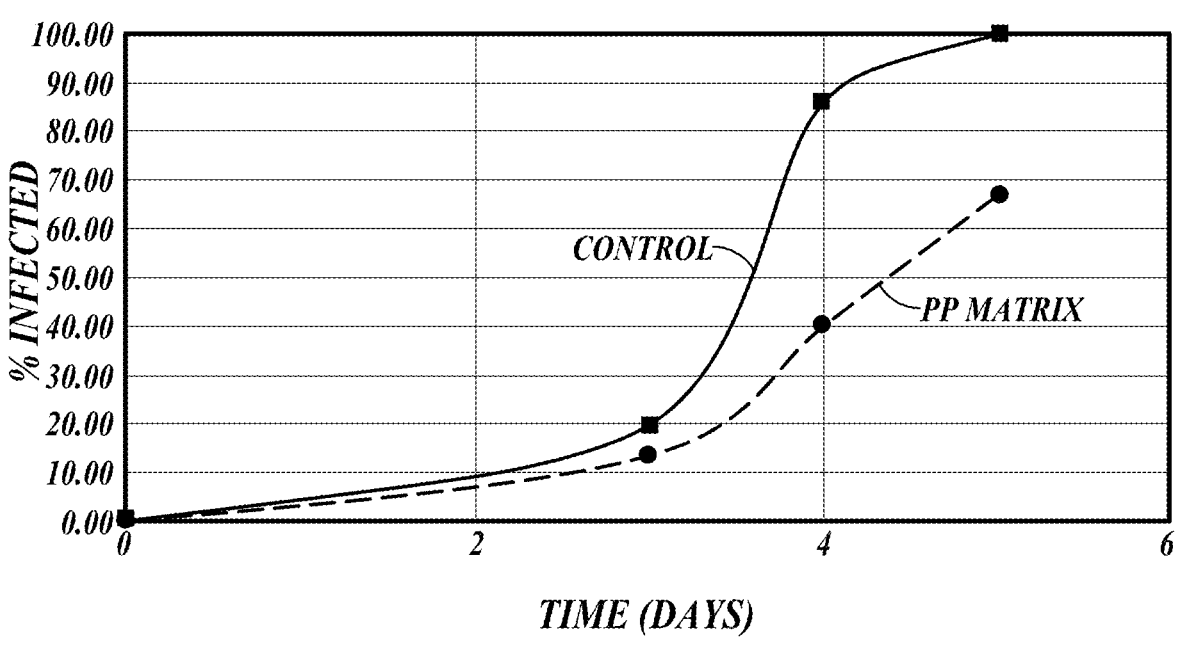
FIG. 18 depicts an exemplary controlled-release delivery composition/system having a fiber-based matrix versus a control, wherein the fiber-based matrix prototype is positioned within a container having strawberries in accordance with the present disclosure at room temperature for a period of 5 days.
Figure 19:
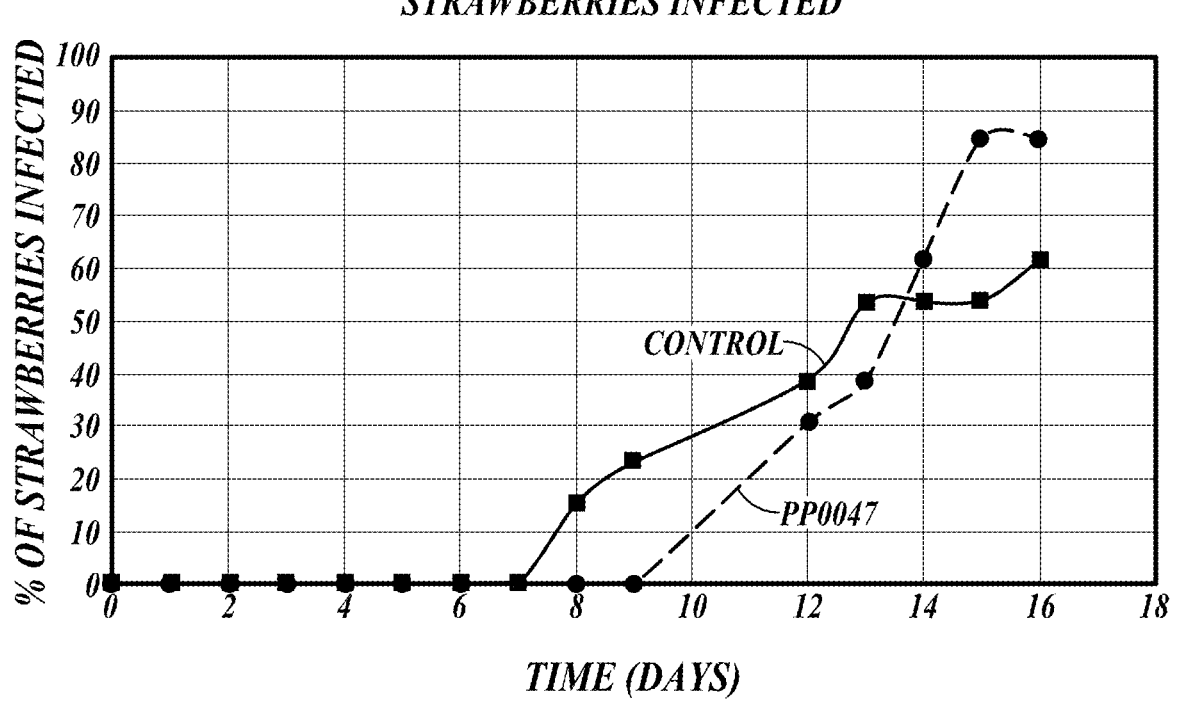
FIG. 19 depicts an exemplary controlled-release delivery composition/system having kraft paper, fatty acid salts, glycerol, $Ca(OH)_2$, and thymol wherein the controlled-release delivery composition/system is positioned on an interior surface of a container having strawberries positioned within the container at refrigerator temperature (2-6° C.) for a period of 16 days.
Figure 20:
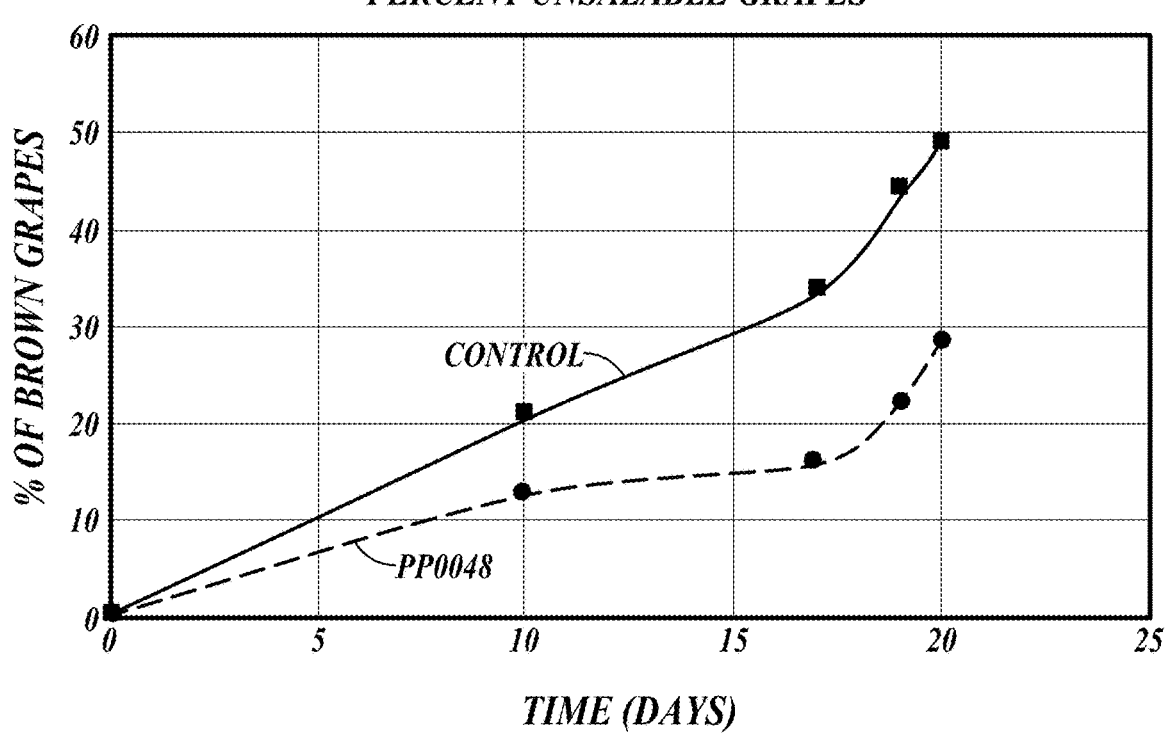
FIG. 20 depicts an exemplary controlled-release delivery composition/system having kraft paper, fatty acid salts, glycerol, $Ca(OH)_2$, and thymol, wherein the controlled-release delivery composition/system is positioned on an interior surface of a container having grapes positioned within the container at room temperature (18-22° C.) for a period of 20 days.
Figure 21:
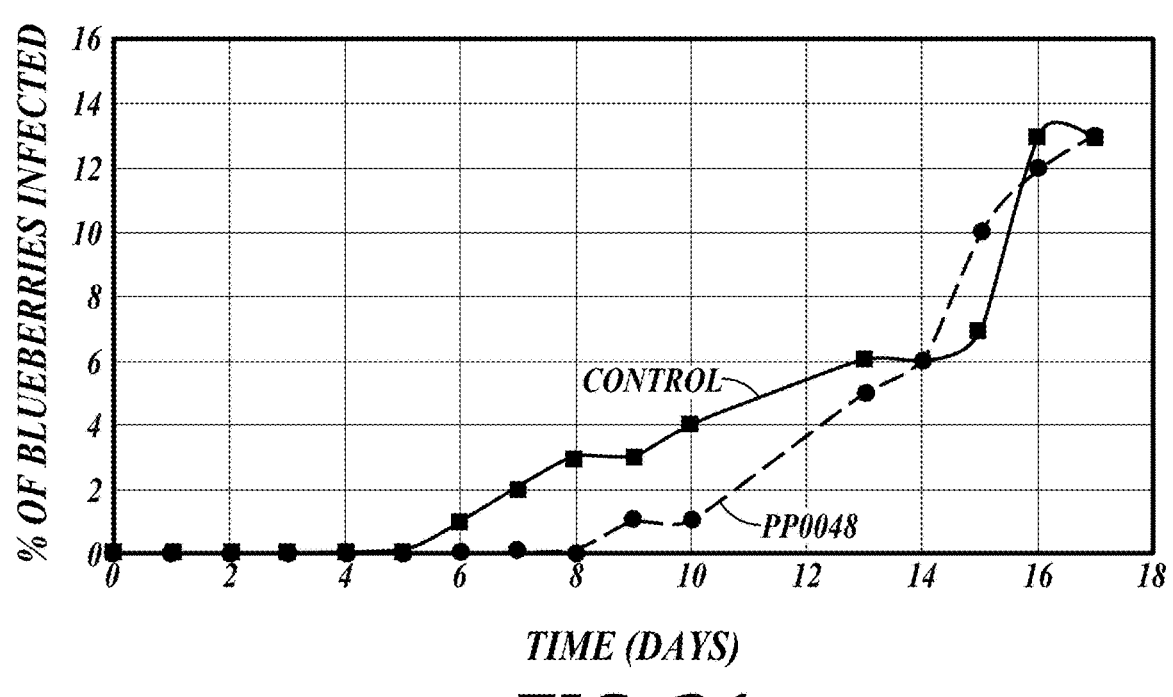
FIG. 21 depicts an exemplary controlled-release delivery composition/system having kraft paper, fatty acid salts, glycerol, Ca(OH)$_2$, and cuminaldehyde, wherein the controlled-release delivery composition/system is positioned on an interior surface of a container having blueberries positioned within the container at room temperature (18-22° C.) for a period of 16 days.

By way of example, FIG. 18 depicts a controlled-release delivery composition/system having a fiber-based matrix versus a control, wherein the controlled-release delivery composition/system is positioned within a container having strawberries in accordance with the present disclosure at room temperature (between 18-22° C.) for a period of 5 days. The fiber-based matrix of the controlled-release delivery composition/system is comprised of polyethylene fibers, water, fatty acid salts, glycerol, and thymol. FIG. 18 illustrates the inhibition of the growth of mold on the strawberries. FIG. 19 depicts a controlled-release delivery composition/system having kraft paper, fatty acid salts, glycerol, Ca(OH)$_2$, and thymol wherein the controlled-release delivery composition/system is positioned on an interior surface of a container having strawberries positioned within the container at refrigerator temperature (2-6° C.) for a period of 16 days. The result is the mold growth on the strawberries was inhibited for two days longer than the control batch of strawberries. FIG. 20 depicts a controlled-release delivery composition/system having kraft paper, fatty acid salts, glycerol, Ca(OH)$_2$, and thymol, wherein the controlled-release delivery composition/system is positioned on an interior surface of a container having grapes positioned within the container at room temperature (18-22° C.) for a period of 20 days. FIG. 21 depicts a controlled-release delivery composition/system having kraft paper, fatty acid salts, glycerol, Ca(OH)$_2$, and cuminaldehyde wherein the controlled-release delivery composition/system is positioned on an interior surface of a container having blueberries positioned within the container at room temperature (18-22° C.) for a period of 16 days.

The matrix material can be processed into different formats and placed on different substrates, depending on the use case required. For example, the matrix can be incorporated into an adhesive label, to be placed on the lid or walls of a fresh produce container. In another example, the matrix can be incorporated into a sheet, which can be incorporated into produce packaging by placing the sheet on top of the one or more produce item or by attaching the sheet to the base of the produce container.

Thus, in accordance with the present disclosure, there have been provided compositions, as well as methods of producing and using same, which fully satisfy the objectives and advantages set forth hereinabove. Although the present disclosure has been described in conjunction with the specific drawings, experimentation, results, and language set forth hereinabove, it is evident that many alternatives, modifications, and variations will be apparent to those skilled in the art. Accordingly, it is intended to embrace all such alternatives, modifications, and variations that fall within the spirit and broad scope of the present disclosure.

The following is a number list of non-limiting illustrative embodiments of the inventive concept disclosed herein.

Embodiment 1. A controlled-release delivery composition for extending life of at least one produce item, wherein the controlled-release delivery composition includes: at least one volatile shelf-life extending agent, wherein the at least one volatile shelf-life extending agent is selected from the group consisting of an antimicrobial, an immunostimulatory compound, an ethylene inhibitor, and combinations thereof; and at least one matrix, wherein the matrix is in a substantially solid or semi-solid physical state, and wherein the at least one matrix is selected from the group consisting of an emulsifier, wax, polymer, ceramic, and combinations thereof; wherein the at least one volatile shelf-life extending agent is contained within the matrix and released from the matrix at a controlled rate; and wherein the controlled-release delivery composition is designed for positioning on at least a portion of at least one surface of the at least one produce item or for positioning within a container in which the at least one produce item is disposed.

Embodiment 2. The controlled-release delivery composition of Embodiment 1, wherein the matrix has a solid physical state.

Embodiment 3. The controlled-release delivery composition of Embodiment 1, wherein the matrix has a semi-solid physical state.

Embodiment 4. The controlled-release delivery composition of any of Embodiments 1-3, wherein the at least one matrix includes a polymer selected from the group consisting of a protein, a polysaccharide, a gum, a synthetic polymer, and combinations thereof.

Embodiment 5. The controlled-release delivery composition of Embodiment 4, wherein at least one of: the protein is selected from the group consisting of collagen, gelatin, silk, gluten, zein, caseins, keratin, soy protein, pea protein, sunflower protein, and combinations thereof; the polysaccharide is selected from the group consisting of cellulose, pectin, chitosan, chitin, alginate, starch, carrageenan, agar, shellac, hyaluronic acid, inulin, lignin, and combinations thereof; the gum is selected from the group consisting of xanthan gum, gum Arabic, Guar gum, locust bean gum, mastic, gellan gum, spruce gum, and combinations thereof; and/or the synthetic polymer is selected from the group consisting of polyethylene, polypropylene, polystyrene, polylactic acid, polyethylene terephthalate, ABS, silicones, polyethylene glycols, poly-vinylacetate, poly-caprolactone, nylon, PVC, and combinations thereof.

Embodiment 6. The controlled-release delivery composition of any of Embodiments 1-5, wherein the at least one matrix includes a ceramic selected from the group consisting of zeolite, activated carbon, silica, alumina, and combinations thereof.

Embodiment 7. The controlled-release delivery composition of any of Embodiments 1-6, further including at least one antioxidant selected from the group consisting of vitamin A, vitamin C, vitamin E, thiols, tocopherol, catechins, anthocyanins, polyphenols, resveratrol, butylated hydroxytoluene (BHT), butylated hydroxyanisole (BHA), and combinations thereof.

Embodiment 8. The controlled-release delivery composition of any of Embodiments 1-7, further including at least one solvent or thinning agent, wherein the at least one solvent or thinning agent is selected from the group consisting of polar solvent, water, oil, and combinations thereof.

Embodiment 9. The controlled-release delivery composition of Embodiment 8, wherein at least one of: the polar solvent is selected from the group consisting of ethanol, glycerol, isopropyl alcohol, acetone, ethyl acetate, benzyl alcohol, 1,3-butylene glycol, glyceryl diacetate, glyceryl triacetate, glyceryl tributyrate, triethyl citrate, and combinations thereof; and the oil is selected from the group consisting of canola oil, grapeseed oil, avocado oil, walnut oil, coconut oil, soybean oil, palm oil, hydrogenated oils, paraffins oil, peanut oil, almond oil, sesame oil, safflower oil, hexane, heptane, and combinations thereof.

Embodiment 10. The controlled-release delivery composition of any of Embodiments 1-9, further including at least one release-rate modifying agent, wherein the release-rate modifying agent is selected from the group consisting of sodium salts, potassium salts, magnesium salts, calcium salts, ferrous fumarate, iron pyrophosphate, ferrous sulfate, ferrous fluconate, ammonium bicarbonate, ammonium sulfate, guanidinium chloride, macrocycles, and combinations thereof.

Embodiment 11. The controlled-release delivery composition of Embodiment 10, wherein at least one of: the sodium salt is selected from the group consisting of sodium chloride, sodium iodide, sodium iodate, sodium fluoride, sodium nitrite, sodium carbonate, sodium bicarbonate, sodium metasilicate, sodium aluminosilicate, sodium malate, sodium acetate, sodium tartarate, sodium citrate, and combinations thereof; the potassium salt is selected from the group consisting of potassium chloride, potassium iodide, dipotassium phosphate, and combinations thereof; the magnesium salt is selected from the group consisting of magnesium chloride, magnesium oxide, magnesium sulfate, and combinations thereof; and/or the calcium salt is selected from the group consisting of calcium hydroxide, calcium oxide, calcium carbonate, calcium chloride, calcium silicate, calcium aluminosilicate, calcium sulfate, tricalcium phosphate, and combinations thereof.

Embodiment 12. The controlled-release delivery composition of Embodiment 10 or 11, wherein the at least one release-rate modifying agent includes at least one of a sodium salt, potassium salt, magnesium salt, or calcium salt, and wherein the at least one release-rate modifying agent is combined with at least one ceramic in powder form.

Embodiment 13. The controlled-release delivery composition of Embodiment 12, wherein the at least one ceramic in powder form is selected from the group consisting of alumina, silica, zeolite, clay, titanium oxide, silicon dioxide, and combinations thereof.

Embodiment 14. The controlled-release delivery composition of Embodiment 13, wherein the clay is selected from the group consisting of bentonite, montmorillonite, illite, vermiculite, talc, and combinations thereof.

Embodiment 15. The controlled-release delivery composition of any of Embodiments 10-14, wherein the macrocycle is selected from the group consisting of alpha-cyclodextrin, beta-cyclodextrin, gamma-cyclodextrin, muscone, civetone, crown ether, and combinations thereof.

Embodiment 16. The controlled-release delivery composition of any of Embodiments 1-15, wherein the controlled-release delivery composition has a microstructure selected from the group consisting of an amorphous microstructure, semicrystalline microstructure, microemulsion microstructure, microporous microstructure, mesoporous microstructure, fibrous microstructure, foam microstructure, particle microstructure, and combinations thereof.

Embodiment 17. The controlled-release delivery composition of Embodiment 16, wherein at least one of: the microemulsion microstructure is selected from the group consisting of micelles, vesicles, cylindrical microstructures, sheet microstructures, and gyroid microstructures; the microporous microstructure is selected from the group consisting of an anodized aluminum, porous activated carbon, or combinations thereof; the mesoporous microstructure includes a silica gel; the fibrous microstructure is selected form a group consisting of paper, felt, linen, and combinations thereof; the foam microstructure is selected from the group consisting of a cork, expanded polystyrene, and combinations thereof; and/or the particle microstructure is selected from the group consisting of a wax microcrystal, ceramic microcrystal, and combinations thereof, and wherein the particle microstructure is positioned within the matrix.

Embodiment 18. The controlled-release delivery composition of any of Embodiments 1-17, further including at least one bonding material disposed on a lower surface of the matrix for releasably attaching the controlled-release delivery composition to the at least one produce item.

Embodiment 19. The controlled-release delivery composition of any of Embodiments 1-18, further including a porous packaging in which the matrix containing the at least one volatile shelf-life extending agent is disposed, wherein the at least one volatile shelf-life extending agent can diffuse through the porous packaging.

Embodiment 20. A controlled-release delivery composition for extending life of at least one produce item, wherein the controlled-release delivery composition includes: at least one volatile shelf-life extending agent, wherein the at least one volatile shelf-life extending agent is selected from the group consisting of an antimicrobial, an immunostimulatory compound, an ethylene inhibitor, and combinations thereof; at least one antioxidant selected from the group consisting of vitamin A, vitamin C, vitamin E, thiols, tocopherol, catechins, anthocyanins, polyphenols, resveratrol, butylated hydroxytoluene (BHT), butylated hydroxyanisole (BHA), and combinations thereof; at least one release-rate modifying agent selected from the group consisting of sodium salts, potassium salts, magnesium salts, calcium salts, ferrous fumurate, iron pyrophosphate, ferrous sulfate, ferrous fluconate, ammonium bicarbonate, ammonium sulfate, guanidinium chloride, macrocycles, and combinations thereof; and at least one matrix, wherein the matrix is in a substantially solid or semi-solid physical state, wherein the at least one matrix is selected from the group consisting of an emulsifier, wax, polymer, ceramic, and combinations thereof, wherein the at least one volatile shelf-life extending agent, the at least one antioxidant, and the at least one release-rate modifying agent are contained within the matrix, and wherein the at least one volatile shelf-life extending agent is released from the matrix at a controlled rate; and wherein the controlled-release delivery composition is designed for positioning on at least a portion of at least one surface of the at least one produce item or for positioning within a container in which the at least one produce item is disposed.

Embodiment 21. The controlled-release delivery composition of Embodiment 20, further including at least one bonding material disposed on a lower surface of the matrix for releasably attaching the controlled-release delivery composition to the at least one produce item.

Embodiment 22. The controlled-release delivery composition of Embodiment 20 or 21, further including a porous packaging in which the matrix containing the at least one volatile shelf-life extending agent is disposed, wherein the at least one volatile shelf-life extending agent can diffuse through the porous packaging.

Embodiment 23. An assembly, including: a container; at least one produce item positioned within the container; and at least one controlled-release delivery composition of any one of Embodiments 1-22, wherein the controlled-release delivery composition is positioned within the container such that the at least one volatile shelf-life extending agent is released from the controlled-release delivery composition.

Embodiment 24. An assembly, including: at least one produce item; and at least one controlled-release delivery composition of any one of Embodiments 1-22, wherein the at least one controlled-release delivery composition is positioned on at least one surface of the at least one produce item.

Embodiment 25. A method of extending a shelf-life of at least one produce item, the method including: releasably attaching at least one controlled-release delivery composition of any one of Embodiments 1-22 to at least a portion of at least one surface of the at least one produce item.

Embodiment 26. A method of extending a shelf-life of at least one produce item, the method including: disposing at least one controlled-release delivery composition of any one of Embodiments 1-22 in a container in which at least one produce item is disposed.

What is claimed is:

1. A controlled-release delivery composition for extending life of at least one produce item, wherein the controlled-release delivery composition comprises:

at least one volatile shelf-life extending agent, wherein the at least one volatile shelf-life extending agent is selected from the group consisting of an antimicrobial, an immunostimulatory compound, an ethylene inhibitor, and combinations thereof; and at least one matrix, wherein the at least one matrix is in a substantially solid or semi-solid physical state, wherein the at least one matrix is selected from the group consisting of an emulsifier, a wax, a polymer, and combinations thereof, wherein the emulsifier is selected from the group consisting of monoglycerides, diglycerides, fatty acids, fatty acid salts, fatty alcohols, lecithin, glycerol, sterols, and combinations thereof, wherein the wax is a beeswax, a lanolin, a Carnauba wax, a Candelilla wax, a Bayberry wax, a soy wax, or a combination thereof, wherein the polymer is a polysaccharide or a synthetic polymer, wherein the polysaccharide is selected from the group consisting of cellulose, pectin, chitosan, chitin, alginate, starch, carrageenan agar, shellac, hyaluronic acid, inulin, lignin, and combinations thereof, wherein the synthetic polymer is selected from the group consisting of polyethylene, polypropylene, polystyrene, polylactic acid, polyethylene terephthalate, ABS, silicones, polyethylene glycols, poly-vinylacetate, poly-caprolactone, nylon, PVC, and combinations thereof;

wherein the at least one volatile shelf-life extending agent is contained within the at least one matrix and released from the at least one matrix at a controlled rate; and wherein the controlled-release delivery composition is designed for positioning on at least a portion of at least one surface of the at least one produce item or for positioning within a container in which the at least one produce item is disposed.

2. The controlled-release delivery composition of claim 1, wherein the at least one matrix has a solid physical state.

3. The controlled-release delivery composition of claim 1, wherein the at least one matrix has a semisolid physical state.

4. The controlled-release delivery composition of claim 1, wherein the at least one matrix is a combination of a polysaccharide and an emulsifier.

5. The controlled-release delivery composition of claim 1, wherein the at least one matrix is polyethylene glycol.

6. The controlled-release delivery composition of claim 1, further comprising at least one antioxidant selected from the group consisting of vitamin C, vitamin E, thiols, tocopherol, catechins, anthocyanins, polyphenols, resveratrol, butylated hydroxytoluene (BHT), butylated hydroxyanisole (BHA), and combinations thereof.

7. The controlled-release delivery composition of claim 1, further comprising at least one solvent or thinning agent, wherein the at least one solvent or thinning agent is selected from the group consisting of polar solvent, water, oil, and combinations thereof.

8. The controlled-release delivery composition of claim 7, wherein at least one of:

the polar solvent is selected from the group consisting of ethanol, glycerol, isopropyl alcohol, acetone, ethyl acetate, benzyl alcohol, 1,3-butylene glycol, glyceryl diacetate, glyceryl triacetate, glyceryl tributyrate, triethyl citrate, and combinations thereof; and the oil is selected from the group consisting of canola oil, grapeseed oil, avocado oil, walnut oil, coconut oil, soybean oil, palm oil, hydrogenated oils, paraffins oil, peanut oil, almond oil, sesame oil, safflower oil, and combinations thereof.

9. The controlled-release delivery composition of claim 1, further comprising at least one release-rate modifying agent, wherein the release-rate modifying agent is selected from the group consisting of sodium salts, potassium salts, magnesium salts, calcium salts, ferrous fumarate, iron pyrophosphate, ferrous sulfate, ferrous fluconate, ammonium bicarbonate, ammonium sulfate, guanidinium chloride, macrocycles, and combinations thereof.

10. The controlled-release delivery composition of claim 9, wherein at least one of:

the sodium salts are selected from the group consisting of sodium chloride, sodium iodide, sodium iodate, sodium fluoride, sodium nitrite, sodium carbonate, sodium bicarbonate, sodium metasilicate, sodium aluminosilicate, sodium malate, sodium acetate, sodium tartarate, sodium citrate, and combinations thereof;

the potassium salts are selected from the group consisting of potassium chloride, potassium iodide, dipotassium phosphate, and combinations thereof;

the magnesium salts are selected from the group consisting of magnesium chloride, magnesium oxide, magnesium sulfate, and combinations thereof; and/or the calcium salts are selected from the group consisting of calcium hydroxide, calcium oxide, calcium carbonate, calcium chloride, calcium silicate, calcium aluminosilicate, calcium sulfate, tricalcium phosphate, and combinations thereof.

11. The controlled-release delivery composition of claim 9, wherein the at least one release-rate modifying agent comprises at least one of the sodium salts, the potassium salts, the magnesium salts, or the calcium salts, and wherein the at least one release-rate modifying agent is combined with at least one ceramic in powder form.

12. The controlled-release delivery composition of claim 11, wherein the at least one ceramic in powder form is selected from the group consisting of alumina, silica, zeolite, clay, titanium oxide, silicon dioxide, and combinations thereof.

13. The controlled-release delivery composition of claim 12, wherein the clay is selected from the group consisting of bentonite, montmorillonite, illite, vermiculite, talc, and combinations thereof.

14. The controlled-release delivery composition of claim 9, wherein the macrocycles is selected from the group consisting of alpha-cyclodextrin, beta-cyclodextrin, gamma-cyclodextrin, muscone, civetone, crown ether, and combinations thereof.

15. The controlled-release delivery composition of claim 1, wherein the controlled-release delivery composition has a microstructure selected from the group consisting of an amorphous microstructure, semicrystalline microstructure, microemulsion microstructure, microporous microstructure, mesoporous microstructure, fibrous microstructure, foam microstructure, particle microstructure, and combinations thereof.

16. The controlled-release delivery composition of claim 15, wherein at least one of: the microemulsion microstructure is selected from the group consisting of micelles, vesicles, cylindrical microstructures, sheet microstructures, and gyroid microstructures;

the microporous microstructure is selected from the group consisting of an anodized aluminum, porous activated carbon, or combinations thereof;

the mesoporous microstructure comprises a silica gel;

the fibrous microstructure is selected form a group consisting of paper, felt, linen, and combinations thereof;

the foam microstructure is selected from the group consisting of a cork, expanded polystyrene, and combinations thereof; and/or the particle microstructure is selected from the group consisting of a wax microcrystal, ceramic microcrystal, and combinations thereof, and wherein the particle microstructure is positioned within the at least one matrix.

17. The controlled-release delivery composition of claim 1, further comprising at least one bonding material disposed on a lower surface of the at least one matrix for releasably attaching the controlled-release delivery composition to the at least one produce item.

18. The controlled-release delivery composition of claim 1, further comprising a porous packaging in which the at least one matrix containing the at least one volatile shelf-life extending agent is disposed, wherein the at least one volatile shelf-life extending agent can diffuse through the porous packaging.

19. A controlled-release delivery composition for extending life of at least one produce item, wherein the controlled-release delivery composition comprises:

at least one volatile shelf-life extending agent, wherein the at least one volatile shelf-life extending agent is selected from the group consisting of an antimicrobial, an immunostimulatory compound, an ethylene inhibitor, and combinations thereof;

at least one antioxidant selected from the group consisting of vitamin A, vitamin C, vitamin E, thiols, tocopherol, catechins, anthocyanins, polyphenols, resveratrol, butylated hydroxytoluene (BHT), butylated hydroxyanisole (BHA), and combinations thereof;

at least one release-rate modifying agent selected from the group consisting of sodium salts, potassium salts, magnesium salts, calcium salts, ferrous fumarate, iron pyrophosphate, ferrous sulfate, ferrous fluconate, ammonium bicarbonate, ammonium sulfate, guanidinium chloride, macrocycles, and combinations thereof; and at least one matrix, wherein the at least one matrix is in a substantially solid or semi-solid physical state, wherein the at least one matrix is selected from the group consisting of an emulsifier, a wax, a polymer, and combinations thereof, wherein the emulsifier is selected from the group consisting of monoglycerides, diglycerides, fatty acids, fatty acid salts, fatty alcohols, lecithin, glycerol, sterols, and combinations thereof, wherein the wax is a beeswax, a lanolin, a Carnauba wax, a Candelilla wax, a Bayberry wax, a soy wax, or a combination thereof, wherein the polymer is a polysaccharide or a synthetic polymer, wherein the polysaccharide is selected from the group consisting of cellulose, pectin, chitosan, chitin, alginate, starch, carrageenan agar, shellac, hyaluronic acid, inulin, lignin, and combinations thereof wherein the synthetic polymer is selected from the group consisting of polyethylene, polypropylene, polystyrene, polylactic acid, polyethylene terephthalate, ABS, silicones, polyethylene glycols, poly-vi-nylacetate, poly-caprolactone, nylon, PVC, and combinations thereof, wherein the at least one volatile shelf-life extending agent, the at least one antioxidant, and the at least one release-rate modifying agent are contained within the at least one matrix, and wherein the at least one volatile shelf-life extending agent is released from the at least one matrix at a controlled rate; and wherein the controlled-release delivery composition is designed for positioning on at least a portion of at least one surface of the at least one produce item or for positioning within a container in which the at least one produce item is disposed.

20. The controlled-release delivery composition of claim 19, further comprising at least one bonding material disposed on a lower surface of the at least one matrix for releasably attaching the controlled-release delivery composition to the at least one produce item.

21. The controlled-release delivery composition of claim 19, further comprising a porous packaging in which the at least one matrix containing the at least one volatile shelf-life extending agent is disposed, wherein the at least one volatile shelf-life extending agent can diffuse through the porous packaging.

* * * * *